United States Patent
Lee et al.

(10) Patent No.: US 12,072,136 B2
(45) Date of Patent: Aug. 27, 2024

(54) REFRIGERATOR AND METHOD FOR CONTROLLING SAME

(71) Applicant: LG ELECTRONICS INC., Seoul (KR)

(72) Inventors: Donghoon Lee, Seoul (KR); Wookyong Lee, Seoul (KR); Sunggyun Son, Seoul (KR); Donghoon Lee, Seoul (KR); Seungseob Yeom, Seoul (KR); Yongjun Bae, Seoul (KR); Chongyoung Park, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

(21) Appl. No.: 17/281,777

(22) PCT Filed: Oct. 1, 2019

(86) PCT No.: PCT/KR2019/012851
§ 371 (c)(1),
(2) Date: Mar. 31, 2021

(87) PCT Pub. No.: WO2020/071741
PCT Pub. Date: Apr. 9, 2020

(65) Prior Publication Data
US 2021/0404724 A1    Dec. 30, 2021

(30) Foreign Application Priority Data

Oct. 2, 2018   (KR) ........................ 10-2018-0117785
Oct. 2, 2018   (KR) ........................ 10-2018-0117819
(Continued)

(51) Int. Cl.
*F25C 1/243*    (2018.01)
*F25C 5/08*     (2006.01)

(52) U.S. Cl.
CPC ................ *F25C 1/243* (2013.01); *F25C 5/08* (2013.01); *F25C 2400/08* (2013.01);
(Continued)

(58) Field of Classification Search
CPC ........ F25C 1/243; F25C 5/08; F25C 2400/08; F25C 2400/10; F25C 2600/04;
(Continued)

(56) References Cited

U.S. PATENT DOCUMENTS 4,910,974 A   3/1990  Hara
5,177,980 A   1/1993  Kawamoto et al.
(Continued)

FOREIGN PATENT DOCUMENTS

CN    1215147      4/1999
CN    1455856     11/2003
(Continued)

OTHER PUBLICATIONS

United States Statutory Invention Registration Reg. No. H229 (Year: 1987).*
(Continued)

*Primary Examiner* — Eric S Ruppert
*Assistant Examiner* — Kirstin U Oswald
(74) *Attorney, Agent, or Firm* — KED & Associates LLP

(57) ABSTRACT

A refrigerator according to the present invention comprises: a storage compartment for storing food; a first temperature sensor for sensing the temperature in the storage compartment; a door for opening and closing the storage compartment; a cold air supply means for supplying cold air into the storage compartment; trays forming ice-making cells which are spaces in which water changes phase into ice due to the cold air; a second temperature sensor for sensing the temperature of the water or ice in the ice-making cells; a heater for supplying heat to the trays; and a control unit for
(Continued)

controlling the heater, wherein, after opening or closing of the door is sensed during the ice-making process, the control unit increases the cooling power of the cold air supply means if an increase in cooling power therefrom is determined to be needed on the basis of the temperature sensed by the first temperature sensor, and decreases the amount of heat applied by the heater if a reduction in heat applied by the heater is determined to be needed on the basis of the change in temperature sensed by the second temperature sensor.

24 Claims, 14 Drawing Sheets

(30) Foreign Application Priority Data

| Oct. 2, 2018 | (KR) | 10-2018-0117821 |
|---|---|---|
| Oct. 2, 2018 | (KR) | 10-2018-0117822 |
| Nov. 16, 2018 | (KR) | 10-2018-0142117 |
| Jul. 6, 2019 | (KR) | 10-2019-0081713 |

(52) U.S. Cl.
CPC ...... *F25C 2400/10* (2013.01); *F25C 2600/04* (2013.01); *F25C 2700/12* (2013.01)

(58) Field of Classification Search
CPC .. F25C 2700/12; F25C 5/06; F25C 2305/022; F25C 2400/14; F25C 1/18; F25C 1/24; F25D 2317/06; F25D 2400/02; F25D 2700/02; F25D 2700/122
USPC .................................................. 62/75
See application file for complete search history.

(56) References Cited

U.S. PATENT DOCUMENTS

| 6,014,865 | A * | 1/2000 | Kim ............... F25D 17/045 62/131 |
|---|---|---|---|
| 6,205,800 | B1 * | 3/2001 | Topper ............... A47F 3/0404 62/155 |
| 6,357,720 | B1 | 3/2002 | Shapiro et al. |
| 6,705,091 | B1 * | 3/2004 | Kim ............... F25C 1/04 62/74 |
| 6,722,142 | B1 * | 4/2004 | Pagel ............... F25D 29/00 62/131 |
| 2004/0025527 | A1 | 2/2004 | Takahashi et al. |
| 2004/0050075 | A1 * | 3/2004 | King ............... F25D 29/00 236/47 |
| 2004/0099004 | A1 | 5/2004 | Somura |
| 2005/0091995 | A1 * | 5/2005 | Kim ............... F25D 27/005 62/126 |
| 2006/0086107 | A1 * | 4/2006 | Voglewede ........ F25C 1/246 62/157 |
| 2008/0059003 | A1 * | 3/2008 | Doberstein ......... F25D 29/008 700/300 |
| 2008/0092574 | A1 * | 4/2008 | Doberstein ......... F25C 1/04 62/233 |
| 2010/0024442 | A1 * | 2/2010 | Damrath ............ F25D 23/12 62/347 |
| 2010/0186429 | A1 * | 7/2010 | Watson ............. F25D 17/02 62/344 |
| 2010/0186431 | A1 * | 7/2010 | Kim ............... F25C 1/18 165/59 |
| 2011/0048045 | A1 | 3/2011 | An et al. |
| 2011/0269085 | A1 * | 11/2011 | Wiker ............... A21B 1/48 219/388 |
| 2013/0014535 | A1 * | 1/2013 | Son ............... F25C 1/10 62/340 |
| 2013/0081412 | A1 | 4/2013 | Son et al. |
| 2013/0167563 | A1 | 7/2013 | Lee et al. |
| 2013/0327074 | A1 * | 12/2013 | Lee ............... F25C 1/04 62/177 |
| 2013/0327082 | A1 | 12/2013 | Son et al. |
| 2014/0038060 | A1 | 2/2014 | Abe |
| 2014/0182325 | A1 | 7/2014 | Lee et al. |
| 2015/0323237 | A1 * | 11/2015 | Kim ............... F25C 1/00 62/340 |
| 2017/0299244 | A1 * | 10/2017 | Alshourbagy ...... F25C 5/06 |
| 2018/0187941 | A1 | 7/2018 | An et al. |
| 2018/0231294 | A1 | 8/2018 | Song et al. |

FOREIGN PATENT DOCUMENTS

| CN | 103033011 | 4/2013 |
|---|---|---|
| EP | 0 326 144 | 8/1989 |
| EP | 1367 345 | 12/2003 |
| EP | 3059526 | 8/2016 |
| JP | H01-131867 | 5/1989 |
| JP | H01-181047 | 7/1989 |
| JP | H 04-124571 A | 4/1992 |
| JP | H04-313661 | 11/1992 |
| JP | H05-203299 | 8/1993 |
| JP | H05-203302 | 8/1993 |
| JP | H05-312447 | 11/1993 |
| JP | H0670543 | 9/1994 |
| JP | H 09-269172 A | 10/1997 |
| JP | 2003130510 A * | 5/2003 |
| JP | 2003-232587 A | 8/2003 |
| JP | 2005326035 | 11/2005 |
| JP | 4572833 | 11/2010 |
| JP | 2011-064371 | 3/2011 |
| JP | 2011064373 | 3/2011 |
| JP | 2011-185541 A | 9/2011 |
| JP | 2011-237077 | 11/2011 |
| JP | 06-070543 | 2/2017 |
| KR | 19980056796 A * | 9/1998 |
| KR | 19980056796 A * | 9/1998 |
| KR | 10-2005-0069319 | 7/2005 |
| KR | 10-2005-0096336 | 10/2005 |
| KR | 10-0610296 B1 | 11/2006 |
| KR | 10-0781261 B1 | 11/2007 |
| KR | 10-2009-0079377 | 7/2009 |
| KR | 10-0924365 B1 | 10/2009 |
| KR | 10-0935746 | 1/2010 |
| KR | 10-2012-0003233 | 1/2012 |
| KR | 10-2013-0009322 | 1/2013 |
| KR | 10-2013-0009332 | 1/2013 |
| KR | 2013-0009521 A | 1/2013 |
| KR | 20130009332 | 1/2013 |
| KR | 10-2014-0088321 | 7/2014 |
| KR | 10-2016-0088665 | 7/2016 |
| KR | 10-1643635 | 7/2016 |
| KR | 10-1850918 B1 | 5/2018 |
| KR | 2018-0080021 A | 7/2018 |
| KR | 10-2018-0100752 | 9/2018 |
| WO | WO-2010073652 A1 * | 7/2010 ............. F25D 29/00 |

OTHER PUBLICATIONS

WO 2010073652 A1—machine translation (Year: 2010).*
JP-2003130510-A, machine translation (Year: 2023).*
Chinese Office Action dated May 19, 2022 issued in CN Application No. 201980064194.2.
European Search Report dated Jul. 13, 2022 issued in EP Application No. 19869500.9.
International Search Report dated Jan. 17, 2020 issued in Application PCT/KR2019/012851.
Korean Office Action dated May 1, 2023 issued in Application No. 10-2018-0117785.
Korean Office Action dated May 8, 2023 issued in Application No. 10-2018-0117819.
Korean Office Action dated May 14, 2023 issued in Application No. 10-2018-0117821.
Korean Office Action dated May 15, 2023 issued in Application No. 10-2018-0117822.
Korean Notice of Allowance dated Nov. 7, 2023 issued in Application No. 10-2018-0117821.

(56) References Cited

OTHER PUBLICATIONS

Korean Notice of Allowance dated Jan. 10, 2024 issued in Application No. 10-2018-0142117.
Korean Office Action dated Jul. 4, 2023 issued in Application No. 10-2018-0142117.
Korean Notice of Allowance dated Feb. 22, 2024, issued in Application No. 10-2018-0117785.
Korean Office Action dated Mar. 12, 2024, issued in Application No. 10-2018-0117822.
Korean Office Action dated May 22, 2024 issued in Application No. 10-2019-0081713.
Korean Office Action dated Jun. 19, 2024 issued in Application No. 10-2018-0117819.

* cited by examiner (a)

(b)

REFRIGERATOR AND METHOD FOR CONTROLLING SAME

CROSS-REFERENCE TO RELATED PATENT APPLICATIONS

This application is a U.S. National Stage Application under 35 U.S.C. § 371 of PCT Application No. PCT/KR2019/012851, filed Oct. 1, 2019, which claims priority to Korean Patent Application Nos. 10-2018-0117785, filed Oct. 2, 2018, 10-2018-0117819, filed Oct. 2, 2018, 10-2018-0117821, filed Oct. 2, 2018, 10-2018-0117822, filed Oct. 2, 2018, 10-2018-0142117, filed Nov. 16, 2018, and 10-2019-0081713, filed Jul. 6, 2019, whose entire disclosures are hereby incorporated by reference.

TECHNICAL FIELD

The present disclosure relates to a refrigerator and a method for controlling the same.

BACKGROUND ART

In general, refrigerators are home appliances for storing foods at a low temperature in a storage chamber that is covered by a door. The refrigerator may cool the inside of the storage space by using cold air to store the stored food in a refrigerated or frozen state. Generally, an ice maker for making ice is provided in the refrigerator. The ice maker makes ice by cooling water after accommodating the water supplied from a water supply source or a water tank into a tray.

The ice maker may separate the made ice from the ice tray in a heating manner or twisting manner.

For example, the ice maker through which water is automatically supplied and the ice automatically separated may be opened upward so that the mode ice is pumped up.

As described above, the ice made in the ice maker may have at least one flat surface such as crescent or cubic shape.

When the ice has a spherical shape, it is more convenient to use the ice, and also, it is possible to provide different feeling of use to a user. Also, even when the made ice is stored, a contact area between the ice cubes may be minimized to minimize a mat of the ice cubes.

An ice maker is disclosed in Korean Registration No. 10-1850918 (hereinafter, referred to as a "prior art document 1") that is a prior art document.

The ice maker disclosed in the prior art document 1 includes an upper tray in which a plurality of upper cells, each of which has a hemispherical shape, are arranged, and which includes a pair of link guide parts extending upward from both side ends thereof, a lower tray in which a plurality of upper cells, each of which has a hemispherical shape and which is rotatably connected to the upper tray, a rotation shaft connected to rear ends of the lower tray and the upper tray to allow the lower tray to rotate with respect to the upper tray, a pair of links having one end connected to the lower tray and the other end connected to the link guide part, and an upper ejecting pin assembly connected to each of the pair of links in at state in which both ends thereof are inserted into the link guide part and elevated together with the upper ejecting pin assembly.

In the prior art document 1, although the spherical ice is made by the hemispherical upper cell and the hemispherical lower cell, since the ice is made at the same time in the upper and lower cells, bubbles containing water are not completely discharged but are dispersed in the water to make opaque ice.

An ice maker is disclosed in Japanese Patent Laid-Open No. 9-269172 (hereinafter, referred to as a "prior art document 2") that is a prior art document.

The ice maker disclosed in the prior art document 2 includes an ice making plate and a heater for heating a lower portion of water supplied to the ice making plate.

In the case of the ice maker disclosed in the prior art document 2, water on one surface and a bottom surface of an ice making block is heated by the heater in an ice making process. Thus, when solidification proceeds on the surface of the water, and also, convection occurs in the water to make transparent ice.

When growth of the transparent ice proceeds to reduce a volume of the water within the ice making block, the solidification rate is gradually increased, and thus, sufficient convection suitable for the solidification rate may not occur.

Thus, in the case of the prior art document 2, when about ⅔ of water is solidified, a heating amount of the heater increases to suppress an increase in the solidification rate.

However, according to prior art document 2, since the heating amount of the heater is increased simply when the volume of water is reduced, it is difficult to make ice having uniform transparency according to the shape of the ice.

DISCLOSURE

Technical Problem

Embodiments provide a refrigerator capable of making ice having uniform transparency as a whole regardless of shape, and a method for controlling the same.

Embodiments provide a refrigerator capable of making spherical ice and having uniform transparency for each unit height of the spherical ice, and a method for controlling the same.

Embodiments provide a refrigerator capable of making ice having uniform transparency as a whole by varying a heating amount of a transparent ice heater in response to the change in the heat transfer amount between water in an ice making cell and cold air in a storage chamber, and a method for controlling the same.

Embodiments provide a refrigerator wherein, if it is necessary to reduce a heating amount of a transparent ice heater after an opening/closing of a door is detected during an ice making process, the heating amount of the transparent ice heater is reduced to prevent deterioration of transparency of ice and reduce the power consumption of a transparent ice heater, and a method for controlling the same.

Embodiments provide a refrigerator wherein, if it is necessary to increase cooling power of a cold air supply part for supply of cold air after an opening/closing of a door is detected during an ice making process, the cooling power of the cold air supply part is increased to quickly lower a temperature of a storage chamber, and an output of a transparent ice heater is increased in response thereto, thereby making ice having uniform transparency as a whole, and a method for controlling the same.

Technical Solution

According to one aspect, a refrigerator may include a tray configured to define a portion of an ice making cell, a heater configured to supply heat to the tray, and a controller configured to control the heater.

The refrigerator may further include a storage chamber and a cold air supply part configured to supply cold air to the storage chamber. Water in the ice making cell may be phase-changed into ice by the cold air supplied to the storage chamber.

The controller may turn on the heater, which supplies heat to the ice making cell, in at least partial section while the cold air supply part supplies cold air to the ice making cell so that bubbles dissolved in the water within the ice making cell moves from a portion, at which the ice is made, toward the water that is in a liquid state to make transparent ice.

When the opening/closing of the door is detected in a state in which the heater is turned on, the controller may determine whether it is necessary to vary the cooling power of the cooling air supply part.

In addition, when the opening/closing of the door is detected in a state in which the heater is turned on, the controller may determine whether it is necessary to vary the heating amount of the heater.

As an example, the controller may determine whether it is necessary to increase the cooling power of the cooling air supply part, based on the temperature sensed by a first temperature sensor configured to sense the temperature of the storage chamber.

When it is necessary to increase the cooling power of the cold air supply part, the controller may increase the cooling power of the cold air supply part, and when it is unnecessary to increase the cooling power of the cold air supply part, the controller may maintain the cooling power of the cooling air supply part.

For example, when the temperature sensed by the first temperature sensor reaches a first set temperature or higher, the controller may increase the cooling power of the cold air supply part, and when the temperature sensed by the first temperature sensor is maintained below the first set temperature, the controller may maintain the cooling power of the cold air supply part.

As another example, when the temperature sensed by the first temperature sensor after the opening/closing of the door is detected is higher by more than a first set value than the temperature sensed by the first temperature sensor when the opening of the door is sensed, the controller may increase the cooling power of the cold air supply part. On the other hand, when the temperature sensed by the first temperature sensor is not higher by more than the first set value than the temperature sensed by the first temperature sensor when the opening of the door is detected, the controller may maintain the cooling power of the cold air supply part.

According to an embodiment, the controller may determine whether it is necessary to reduce the heating amount of the heater, based on the change in temperature sensed by a second temperature sensor configured to the temperature of the ice making cell.

When the controller determines that it is necessary to reduce the heating amount of the heater, the controller may reduce the heating amount of the heater, and when the controller determines that it is unnecessary to reduce the heating amount of the heater, the controller may maintain the heating amount of the heater.

As another example, the controller may reduce the heating amount of the transparent ice heater when the temperature sensed by the second temperature sensor is higher than or equal to a second set temperature after the opening/closing of the door is detected. On the other hand, when the temperature sensed by the second temperature sensor is maintained below the second set temperature, the controller may maintain the heating amount of the heater.

As another example, when the temperature sensed by the second temperature sensor after the opening/closing of the door is detected is increased by more than a second set value than the temperature sensed by the second temperature sensor before the opening/closing of the door is detected, the controller may reduce the heating amount of the heater. On the other hand, when the temperature sensed by the second temperature sensor is not increased by more than the second set value than the temperature sensed by the second temperature sensor before the opening/closing of the door is detected, the controller may maintain the heating amount of the heater.

As another example, after the opening/closing of the door is detected, if the current heating amount of the heater is less than or equal to a reference value, the controller may maintain the heating amount of the heater, and when the current heating amount of the heater is greater than the reference value, the controller may reduce the heating amount of the heater.

For example, when the controller determines that it is necessary to reduce the heating amount of the heater, the controller may turn off the heater.

When the cooling power of the cold air supply part increases, the controller may increase the heating amount of the heater.

The ice making time when the opening/closing of the door is detected and the heating amount of the heater is reduced may be longer than the ice making time when the opening/closing of the door is not detected.

The tray may include a first tray configured to define a portion of the ice making cell and a second tray configured to define another portion of the ice making cell. The second tray may contact the first tray in the ice making process and may be spaced apart from the first tray in an ice separation process. The second tray may be connected to a driver to receive power from the driver.

Due to the operation of the driver, the second tray may move from a water supply position to an ice making position. Also, due to the operation of the driver, the second tray may move from the ice making position to an ice separation position. The water supply of the ice making cell starts when the second tray moves to a water supply position. After the water supply is completed, the second tray may be moved to the ice making position. After the second tray moves to the ice making position, the cold air supply part may supply the cold air to the ice making cell.

When the ice is completely made in the ice making cell, the second tray move to the ice separation position in a forward direction so as to take out the ice in the ice making cell. After the second tray moves to the ice separation position, the second tray may move to the water supply position in the reverse direction, and the water supply may start again.

According to one aspect, the controller may control one or more of the cooling power of the cold air supply part and the heating amount of the heater to vary according to a mass per unit height of water in the ice making cell, so that the transparency for each unit height of the water in the ice making cell is uniform.

A plurality of sections may be defined based on the unit height of water. A reference heating amount of the heater in each of the plurality of sections may be predetermined. When the ice making cell has a spherical shape, the controller may perform control so that the heating amount of the heater decreases and then increases during the ice making process.

When the temperature sensed by the temperature sensor reaches the reference temperature corresponding to the section immediately next to the current section, the controller may operate the heater with the reference heating amount corresponding to the next section.

One of the first tray and the second tray may be made of a non-metal material so as to reduce a heat transfer rate of the heater. The second tray may be disposed below the first tray. The heater may be disposed adjacent to the second tray so that water starts to freeze from above in the ice making cell. At least the second tray may be made of a non-metal material. At least one of the first tray and the second tray may be made of a flexible material so that the shape thereof is deformed during the ice separation process and is returned to the original shape.

According to another aspect, a method for controlling a refrigerator relates to a method for controlling a refrigerator that includes a first tray accommodated in a storage chamber, a second tray configured to define an ice making cell together with the first tray, a driver configured to move the second tray, and a heater configured to supply heat to at least one of the first tray and the second tray.

According to another aspect, the method for controlling a refrigerator may include: performing water supply of the ice making cell when the second tray moves to a water supply position; performing ice making after the water supply is completed and the second tray moves from the water supply position to an ice making position in a reverse direction; turning on the heater during an ice making process; detecting opening/closing of a door during the ice making process; when the opening/closing of the door is detected, determining whether it is necessary to reduce a heating amount of the heater, based on a temperature sensor configured to sense a temperature of the ice making cell; and when it is necessary to reduce the heating amount of the heater, reducing the heating amount of the heater.

When it is unnecessary to reduce the heating amount of the heater, the heating amount of the heater may be maintained. For example, the heater may be turned off in a process in which the heating amount of the heater is reduced.

The method for controlling the refrigerator may further include: determining whether the ice making is completed; and when the ice making is completed, moving the second tray from the ice making position to an ice separation position in a forward direction.

According to another aspect, a method for controlling a refrigerator relates to a method for controlling a refrigerator, which includes a first tray and a second tray configured to define a spherical ice making cell, a first temperature sensor configured to sense a temperature of a storage chamber in which the first tray and the second tray are disposed, a second temperature sensor configured to sense a temperature of the ice making cell, a heater configured to supply heat to the ice making cell, and a cold air supply part configured to supply cold air to the ice making cell.

The method for controlling the refrigerator may include: after the water supply of the ice making cell is completed, starting ice making by supplying cold air to the ice making cell by the cold air supply part; turning on the heater after the ice making starts; determining whether the ice making is complete; and when the ice making is complete, moving the second tray from the ice making position to the ice separation position in a forward direction.

During the ice making process, the controller may determine whether opening/closing of a door for opening or closing the storage chamber is detected.

If the opening/closing of the door is detected, when the controller determines that it is necessary to increase cooling power of the cold air supply part based on the temperature sensed by the first temperature sensor, the controller may increase the cooling power of the cold air supply part. If it is determined that it is unnecessary to increase the cooling power of the cold air supply part, the cooling power of the cold air supply part may be maintained. When it is determined that it is necessary to reduce the heating amount of the heater based on the change in temperature sensed by the second temperature sensor, the heating amount of the heater may be reduced. When it is determined that it is unnecessary to reduce the heating amount of the heater, the heating amount of the heater may be maintained.

According to further another aspect, a refrigerator may include a controller that, when a first transparent ice operation and a second transparent ice operation for door load response collide, preferentially performs the second transparent ice operation and stops the first transparent ice operation.

The refrigerator may include: a cold air supply part configured to supply cold air to a storage chamber; a first temperature sensor configured to sense a temperature of the storage chamber; a first tray disposed in the storage chamber and configured to define a portion of an ice making cell that is a space in which water is phase-changed into ice by the cold air; a second tray configured to define another portion of the ice making cell, the second tray being connected to a driver to contact the first tray during an ice making process and to be spaced apart from the first tray during an ice separation process; a water supply part configured to supply water into the ice making cell; a second temperature sensor configured to sense a temperature of the water or the ice within the ice making cell; and a heater disposed adjacent to at least one of the first tray or the second tray.

The first transparent ice operation may include performing control so that, after the water supply of the ice making cell is completed, the controller controls the cold air supply part to supply cold air to the ice making cell, the heater is turned on in at least some sections while the cold air supply part supplies cold air, and the turned-on heater is variable in a predetermined reference heating amount in each of a plurality of pre-divided sections.

The second transparent ice operation may include a process of performing control so that, when the start condition of the door load response operation for the cold air supply part is satisfied, the controller increases the cooling power of the cold air supply part in order to remove the heat load inputted to the storage chamber by opening or closing the door, when the start condition of the door load response operation for the heater is satisfied, the controller reduces the deterioration of the ice making efficiency due to the lowering of the ice making rate caused by the inputted heat load, and the controller controls the heating amount of the heater to be smaller than the heating amount during the first transparent ice operation in order to maintain the ice making rate within a predetermined range to uniformly maintain the transparency of ice.

The case in which the start condition of the door load response operation for the cold air supply part is satisfied may include at least one of a case in which the first set time elapses from the detection of the opening of the door, a case in which the temperature sensed by the first temperature sensor becomes higher than the first set temperature after the opening/closing of the door is detected, and a case in which the temperature is higher by more than the first set value than the temperature sensed by the first temperature sensor after the opening/closing of the door is detected.

The case in which the start condition of the door load response operation for the heater is satisfied may include at least one of a case in which the second set time elapses from the detection of the opening of the door, a case in which the temperature sensed by the second temperature sensor becomes higher than or equal to the second set temperature after the opening/closing of the door is detected, a case in which the temperature is higher by more than a second set value than the temperature sensed by the second temperature sensor after the opening/closing of the door is detected, a case in which the change in temperature sensed by the second temperature sensor per unit time after the opening/closing of the door is detected is greater than zero, a case in which the current heating amount of the heater is greater than a reference value after the opening/closing of the door is detected, and a case in which the start condition of the door load response operation for the cold air supply parts is satisfied.

The second set value may be set differently according to a plurality of sections, and at least one of the second set values may be greater than the first set value.

After both the end condition of the door load response operation for the cold air supply part and the end condition of the door load response operation for the heater are satisfied, the controller may control the first transparent ice operation to resume.

The case in which the end condition of the door load response operation for the cold air supply part is satisfied may include at least one of a case in which the A set time elapses from the start of the door load response operation, a case in which the temperature sensed by the first temperature sensor becomes less than or equal to the A set temperature after the door load response operation starts, and a case in which the temperature sensed by the first temperature sensor is lower than or equal to the A set value after the door load response operation starts.

The case in which the end condition of the defrosting response operation for the heater is satisfied may include at least one of a case in which the B set time elapses after the door load response operation starts, a case in which the temperature sensed by the second temperature sensor after the door load response operation starts is equal to or lower than the B set temperature, a case in which, after the door load response operation starts, the temperature is lower than the temperature detected by the second temperature sensor by the B set value or more, a case in which the amount of change in temperature detected by the second temperature sensor per unit time after the door load response operation starts is less than zero, and a case in which the door load process operation for the cold air supply part is ended.

The plurality of pre-divided sections may include at least one of a case in which the sections are classified based on the unit height of the water to be iced, a case in which the sections are divided based on the elapsed time after the second tray moves to the ice making position, and a case in which the sections are divided based on the temperature detected by the second temperature sensor after the second tray moves to the ice making position.

When the ice making cell has a spherical shape, the controller may perform control so that the heating amount of the heater decreases and then increases during the ice making process.

Advantageous Effects

According to embodiments, since the heater is turned on in at least partial section while the cold air supply part supplies cold air, an ice making rate may decrease by the heat of the heater so that the bubbles dissolved in the water inside the ice making cell move toward the liquid water from the portion at which the ice is made, thereby making the transparent ice.

In particular, according to the embodiments, one or more of the cooling power of the cold air supply part and the heating amount of the heater may be controlled to vary according to the mass per unit height of water in the ice making cell to make the ice having the uniform transparency as a whole regardless of the shape of the ice making cell.

In addition, after the opening/closing of the door is detected, the cooling power of the cold air supply part is varied based on the temperature sensed by the first temperature sensor. Thus, if the temperature of the freezing compartment rises, the temperature of the freezing compartment can be quickly lowered. In response to this, since the heating amount of the transparent ice heater is varied, it is possible to minimize a decrease in the transparency of ice.

In addition, if the temperature of the ice making cell rises, power consumption of the transparent ice heater can be reduced by reducing the heating amount of the transparent ice heater.

MODE FOR INVENTION

Figure 1:
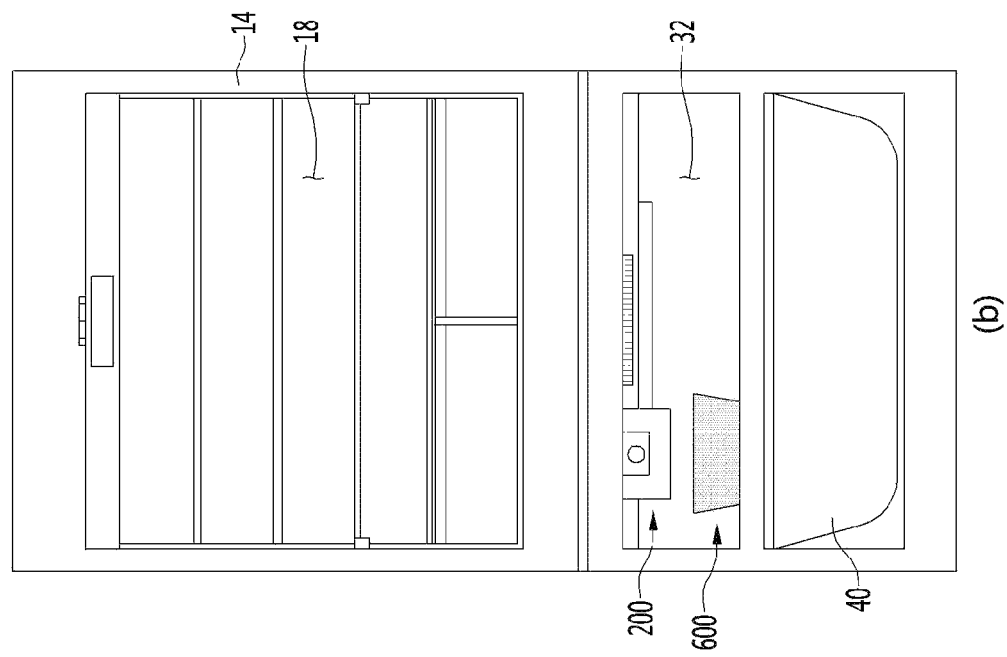
FIG. 1(a)-(b) is a front view of a refrigerator according to an embodiment.
Figure 1:
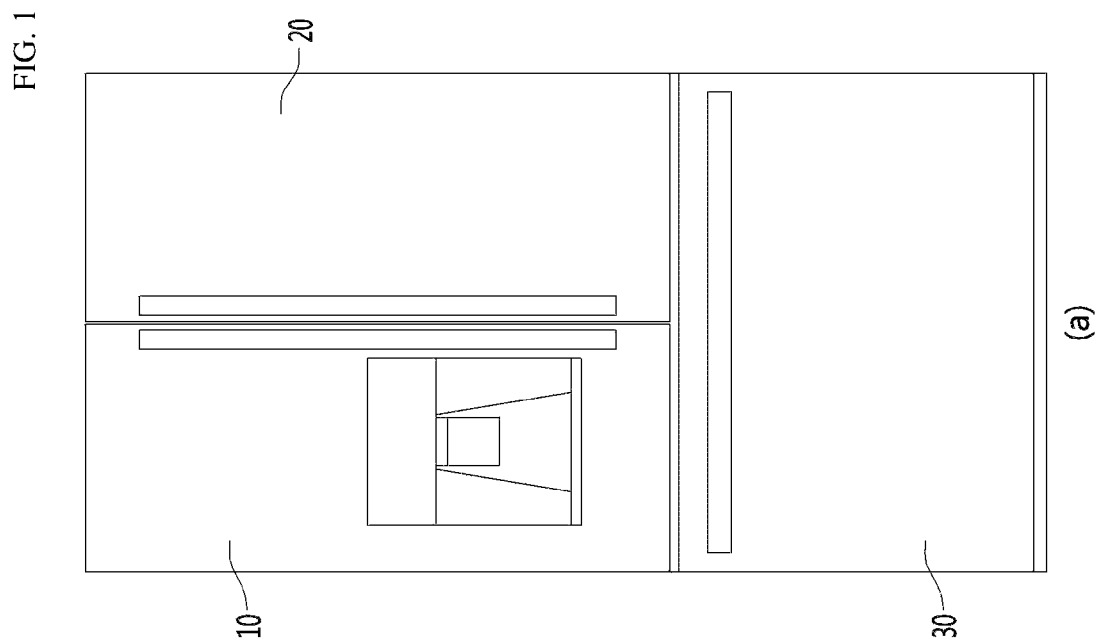

Hereinafter, some embodiments of the present disclosure will be described in detail with reference to the accompanying drawings. It should be noted that when components in the drawings are designated by reference numerals, the same components have the same reference numerals as far as possible even though the components are illustrated in different drawings. Further, in description of embodiments of the present disclosure, when it is determined that detailed descriptions of well-known configurations or functions disturb understanding of the embodiments of the present disclosure, the detailed descriptions will be omitted.

Also, in the description of the embodiments of the present disclosure, the terms such as first, second, A, B, (a) and (b) may be used. Each of the terms is merely used to distinguish the corresponding component from other components, and does not delimit an essence, an order or a sequence of the corresponding component. It should be understood that when one component is "connected", "coupled" or "joined" to another component, the former may be directly connected or jointed to the latter or may be "connected", coupled" or "joined" to the latter with a third component interposed therebetween.

FIG. 1(a)-(b) is a front view of a refrigerator according to an embodiment.

Referring to FIG. 1, a refrigerator according to an embodiment may include a cabinet 14 including a storage chamber and a door that opens and closes the storage chamber.

The storage chamber may include a refrigerating compartment 18 and a freezing compartment 32. The refrigerating compartment 14 is disposed at an upper side, and the freezing compartment 32 is disposed at a lower side. Each of the storage chambers may be opened and closed individually by each door. For another example, the freezing compartment may be disposed at the upper side and the refrigerating compartment may be disposed at the lower side. Alternatively, the freezing compartment may be disposed at one side of left and right sides, and the refrigerating compartment may be disposed at the other side.

The freezing compartment 32 may be divided into an upper space and a lower space, and a drawer 40 capable of being withdrawn from and inserted into the lower space may be provided in the lower space.

The door may include a plurality of doors 10, 20, 30 for opening and closing the refrigerating compartment 18 and the freezing compartment 32. The plurality of doors 10, 20, and 30 may include some or all of the doors 10 and 20 for opening and closing the storage chamber in a rotatable manner and the door 30 for opening and closing the storage chamber in a sliding manner.

The freezing compartment 32 may be provided to be separated into two spaces even though the freezing compartment 32 is opened and closed by one door 30.

In this embodiment, the freezing compartment 32 may be referred to as a first storage chamber, and the refrigerating compartment 18 may be referred to as a second storage chamber.

The freezing compartment 32 may be provided with an ice maker 200 capable of making ice. The ice maker 200 may be disposed, for example, in an upper space of the freezing compartment 32.

An ice bin 600 in which the ice made by the ice maker 200 falls to be stored may be disposed below the ice maker 200. A user may take out the ice bin 600 from the freezing compartment 32 to use the ice stored in the ice bin 600. The ice bin 600 may be mounted on an upper side of a horizontal wall that partitions an upper space and a lower space of the freezing compartment 32 from each other.

Although not shown, the cabinet 14 is provided with a duct supplying cold air to the ice maker 200. The duct guides the cold air heat-exchanged with a refrigerant flowing through the evaporator to the ice maker 200. For example, the duct may be disposed behind the cabinet 14 to discharge the cold air toward a front side of the cabinet 14. The ice maker 200 may be disposed at a front side of the duct. Although not limited, a discharge hole of the duct may be provided in one or more of a rear wall and an upper wall of the freezing compartment 32.

Although the above-described ice maker 200 is provided in the freezing compartment 32, a space in which the ice maker 200 is disposed is not limited to the freezing compartment 32. For example, the ice maker 200 may be disposed in various spaces as long as the ice maker 200 receives the cold air.

Figure 2:
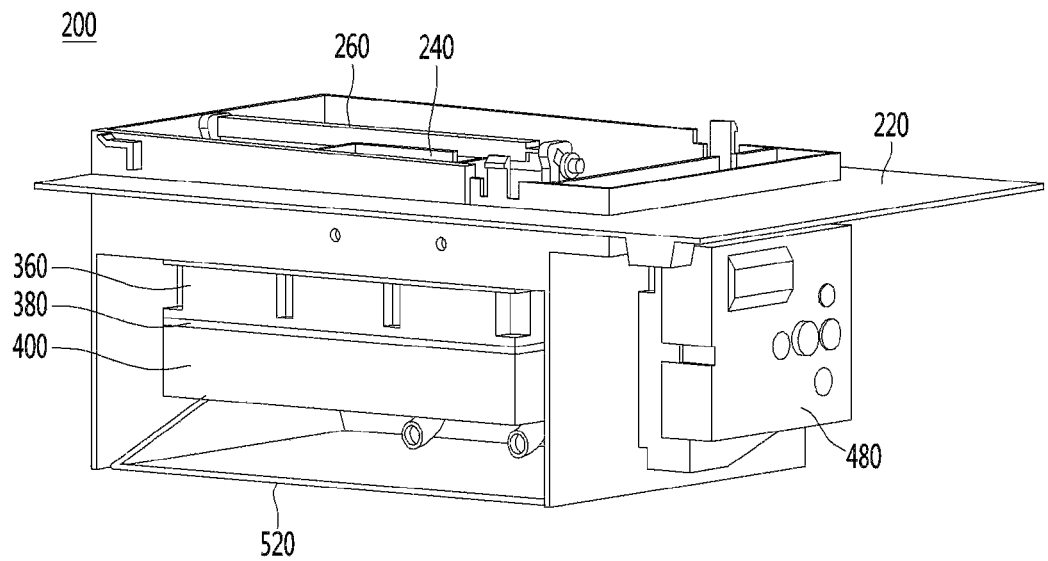
FIG. 2 is a perspective view of an ice maker according to an embodiment.
Figure 3:
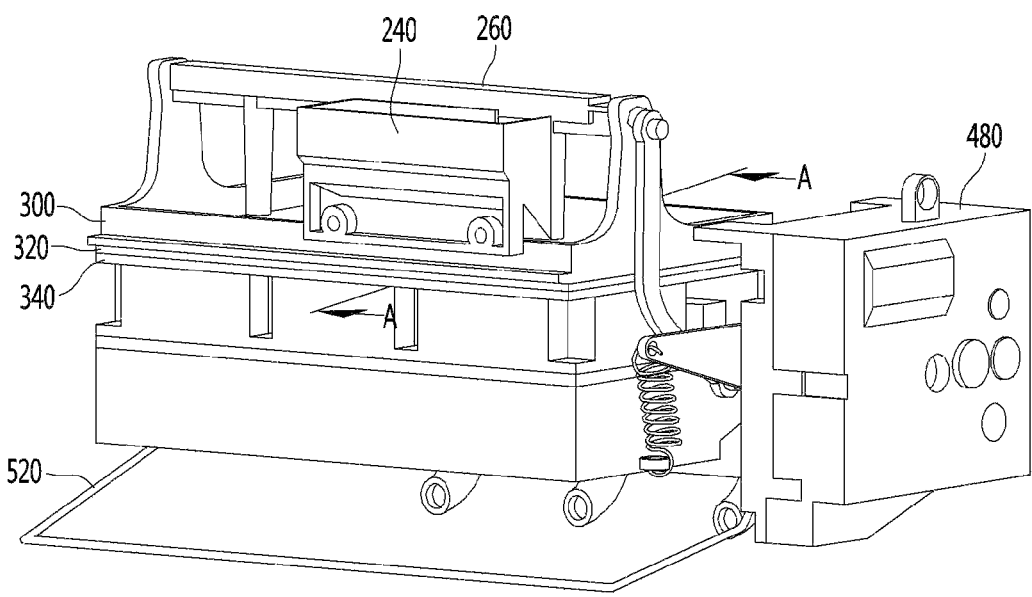
FIG. 3 is a perspective view illustrating a state in which a bracket is removed from the ice maker of FIG. 2.
Figure 4:
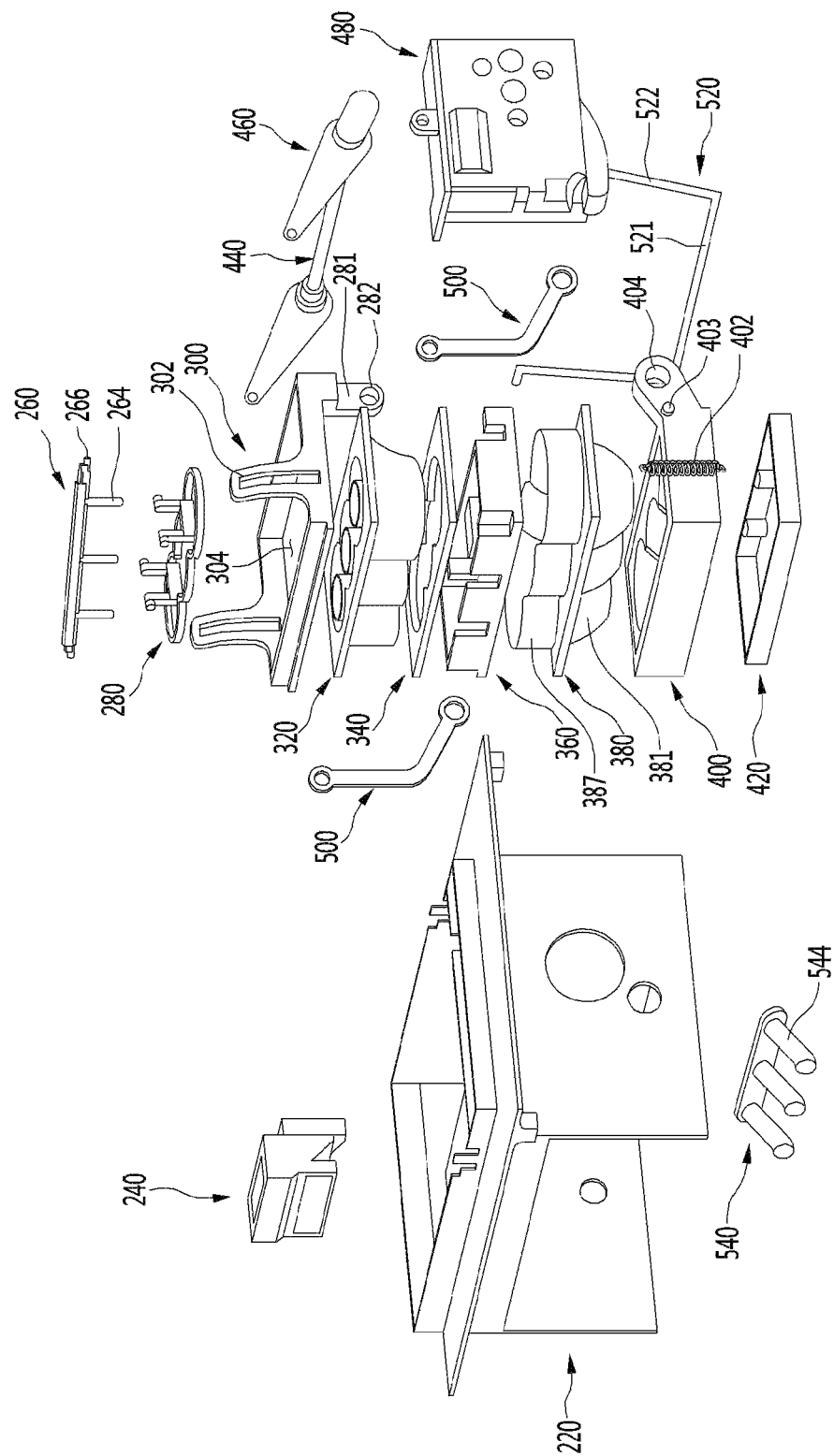
FIG. 4 is an exploded perspective view of the ice maker according to an embodiment.
Figure 5:
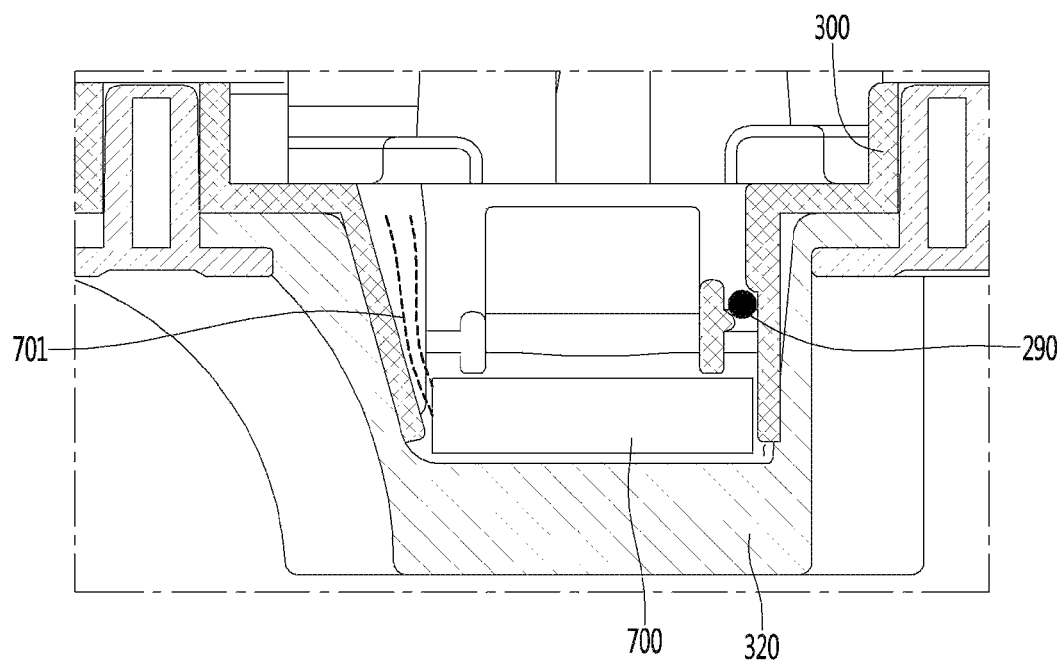
FIG. 5 is a cutaway cross-sectional view taken along line A-A of FIG. 3 for showing a second temperature sensor installed in an ice maker according to an embodiment.

FIG. 2 is a perspective view of an ice maker according to an embodiment, FIG. 3 is a perspective view illustrating a state in which a bracket is removed from the ice maker of FIG. 2, and FIG. 4 is an exploded perspective view of the ice maker according to an embodiment. FIG. 5 is a cutaway cross-sectional view taken along line A-A of FIG. 3 for showing a second temperature sensor installed in an ice maker according to an embodiment.

Figure 6:
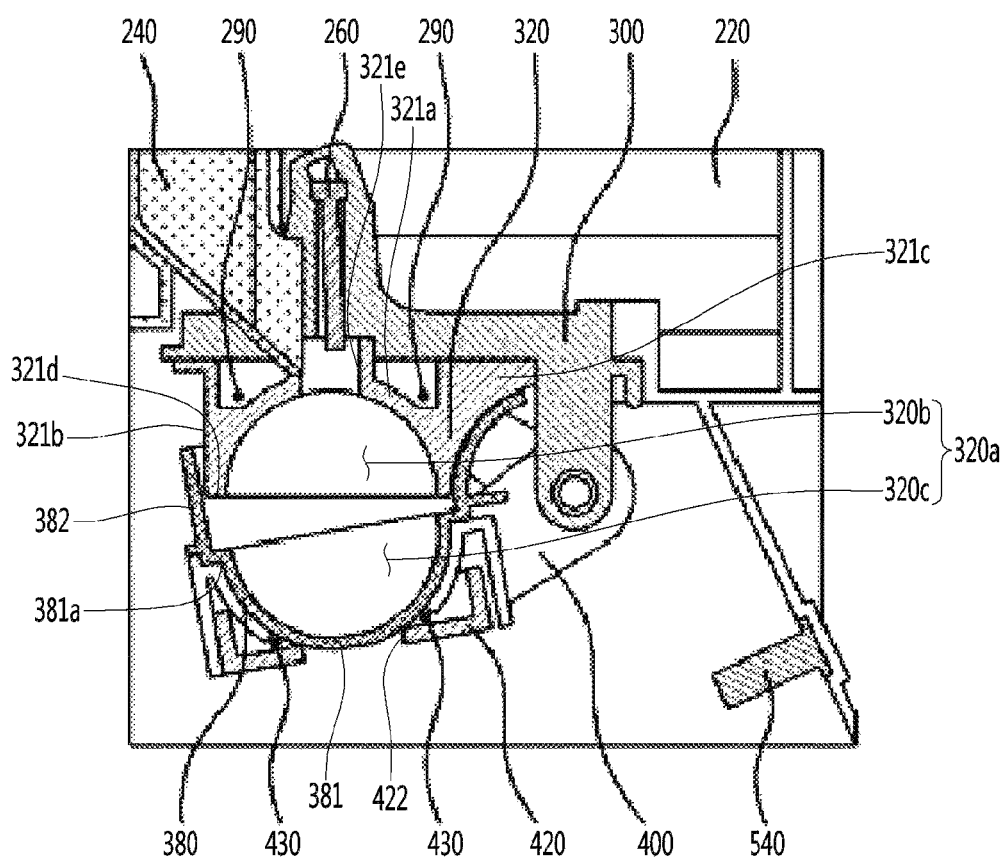
FIG. 6 is a longitudinal cross-sectional view of an ice maker when a second tray is disposed at a water supply position according to an embodiment.

FIG. 6 is a longitudinal cross-sectional view of an ice maker when a second tray is disposed at a water supply position according to an embodiment.

Referring to FIGS. 2 to 6, each component of the ice maker 200 may be provided inside or outside the bracket 220, and thus, the ice maker 200 may constitute one assembly.

The bracket 220 may be installed at, for example, the upper wall of the freezing compartment 32. A water supply part 240 may be installed on the upper side of the inner surface of the bracket 220. The water supply part 240 may be provided with openings at upper and lower sides so that water supplied to the upper side of the water supply part 240 may be guided to the lower side of the water supply part 240. Since the upper opening of the water supply part 240 is larger than the lower opening thereof, a discharge range of water guided downward through the water supply part 240 may be limited. A water supply pipe to which water is supplied may be installed above the water supply part 240. The water supplied to the water supply part 240 may move downward. The water supply part 240 may prevent the water discharged from the water supply pipe from dropping from a high position, thereby preventing the water from splashing. Since the water supply part 240 is disposed below the water supply pipe, the water may be guided downward without splashing up to the water supply part 240, and an amount of splashing water may be reduced even if the water moves downward due to the lowered height.

The ice maker 200 may include an ice making cell 320a in which water is phase-changed into ice by the cold air.

The ice maker 200 may include a first tray 320 defining at least a portion of a wall for providing the ice making cell 320a, and a second tray 380 defining at least another portion of the wall for providing the ice making cell 320a.

Although not limited, the ice making cell 320a may include a first cell 320b and a second cell 320c. The first tray 320 may define the first cell 320b, and the second tray 380 may define the second cell 320c.

The second tray 380 may be disposed to be relatively movable with respect to the first tray 320. The second tray 380 may linearly rotate or rotate. Hereinafter, the rotation of the second tray 380 will be described as an example.

For example, in an ice making process, the second tray 380 may move with respect to the first tray 320 so that the first tray 320 and the second tray 380 contact each other. When the first tray 320 and the second tray 380 contact each other, the complete ice making cell 320a may be defined.

On the other hand, the second tray 380 may move with respect to the first tray 320 during the ice making process after the ice making is completed, and the second tray 380 may be spaced apart from the first tray 320.

In this embodiment, the first tray 320 and the second tray 380 may be arranged in a vertical direction in a state in which the ice making cell 320a is formed. Accordingly, the first tray 320 may be referred to as an upper tray, and the second tray 380 may be referred to as a lower tray.

A plurality of ice making cells 320a may be defined by the first tray 320 and the second tray 380. In FIG. 4, three ice making cells 320a are provided as an example.

When water is cooled by cold air while water is supplied to the ice making cell 320a, ice having the same or similar shape as that of the ice making cell 320a may be made.

In this embodiment, for example, the ice making cell 320a may be provided in a spherical shape or a shape similar to a spherical shape. In this case, the first cell 320b may be provided in a spherical shape or a shape similar to a spherical shape. Also, the second cell 320c may be provided in a spherical shape or a shape similar to a spherical shape. The ice making cell 320a may have a rectangular parallelepiped shape or a polygonal shape.

The ice maker 200 may further include a first tray case 300 coupled to the first tray 320.

For example, the first tray case 300 may be coupled to the upper side of the first tray 320. The first tray case 300 may be manufactured as a separate part from the bracket 220 and then may be coupled to the bracket 220 or integrally formed with the bracket 220.

The ice maker 200 may further include a first heater case 280. An ice separation heater 290 may be installed in the first heater case 280. The heater case 280 may be integrally formed with the first tray case 300 or may be separately formed.

The ice separation heater 290 may be disposed at a position adjacent to the first tray 320. The ice separation heater 290 may be, for example, a wire type heater. For example, the ice separation heater 290 may be installed to contact the first tray 320 or may be disposed at a position spaced a predetermined distance from the first tray 320. In any cases, the ice separation heater 290 may supply heat to the first tray 320, and the heat supplied to the first tray 320 may be transferred to the ice making cell 320a.

The ice maker 200 may further include a first tray cover 340 disposed below the first tray 320.

The first tray cover 340 may be provided with an opening corresponding to a shape of the ice making cell 320a of the first tray 320 and may be coupled to a lower surface of the first tray 320.

The first tray case 300 may be provided with a guide slot 302 inclined at an upper side and vertically extending at a lower side. The guide slot 302 may be provided in a member extending upward from the first tray case 300. A guide protrusion 266 of the first pusher 260, which will be described later, may be inserted into the guide slot 302. Thus, the guide protrusion 266 may be guided along the guide slot 302.

The first pusher 260 may include at least one extension part 264. For example, the first pusher 260 may include the extension part 264 provided with the same number as the number of ice making cells 320a, but is not limited thereto. The extension part 264 may push out the ice disposed in the ice making cell 320a during the ice separation process. For example, the extension part 264 may be inserted into the ice making cell 320a through the first tray case 300. Therefore, the first tray case 300 may be provided with a hole 304 through which a portion of the first pusher 260 passes.

The guide protrusion 266 of the first pusher 260 may be coupled to a pusher link 500. In this case, the guide protrusion 266 may be coupled to the pusher link 500 so as to be rotatable. Therefore, when the pusher link 500 moves, the first pusher 260 may also move along the guide slot 302.

The ice maker 200 may further include a second tray case 400 coupled to the second tray 380.

The second tray case 400 may be disposed at a lower side of the second tray to support the second tray 380. For example, at least a portion of the wall defining the second cell 320a of the second tray 380 may be supported by the second tray case 400.

A spring 402 may be connected to one side of the second tray case 400. The spring 402 may provide elastic force to the second tray case 400 to maintain a state in which the second tray 380 contacts the first tray 320.

The ice maker 200 may further include a second tray cover 360.

The second tray 380 may include a circumferential wall 382 surrounding a portion of the first tray 320 in a state of contacting the first tray 320. The second tray cover 360 may cover the circumferential wall 382.

The ice maker 200 may further include a second heater case 420. A transparent ice heater 430 may be installed in the second heater case 420.

The transparent ice heater 430 will be described in detail.

The controller 800 according to this embodiment may control the transparent ice heater 430 so that heat is supplied to the ice making cell 320a in at least partial section while cold air is supplied to the ice making cell 320a to make the transparent ice.

An ice making rate may be delayed so that bubbles dissolved in water within the ice making cell 320a may move from a portion at which ice is made toward liquid water by the heat of the transparent ice heater 430, thereby making transparent ice in the ice maker 200. That is, the bubbles dissolved in water may be induced to escape to the outside of the ice making cell 320a or to be collected into a predetermined position in the ice making cell 320a.

When a cold air supply part 900 to be described later supplies cold air to the ice making cell 320a, if the ice making rate is high, the bubbles dissolved in the water inside the ice making cell 320a may be frozen without moving from the portion at which the ice is made to the liquid water, and thus, transparency of the ice may be reduced.

On the contrary, when the cold air supply part 900 supplies the cold air to the ice making cell 320a, if the ice making rate is low, the above limitation may be solved to increase in transparency of the ice. However, there is a limitation in which an ice making time increases.

Accordingly, the transparent ice heater 430 may be disposed at one side of the ice making cell 320a so that the heater locally supplies heat to the ice making cell 320a, thereby increasing in transparency of the made ice while reducing the ice making time.

When the transparent ice heater 430 is disposed on one side of the ice making cell 320a, the transparent ice heater 430 may be made of a material having thermal conductivity less than that of the metal to prevent heat of the transparent ice heater 430 from being easily transferred to the other side of the ice making cell 320a.

At least one of the first tray 320 and the second tray 380 may be made of a resin including plastic so that the ice attached to the trays 320 and 380 is separated in the ice making process.

At least one of the first tray 320 or the second tray 380 may be made of a flexible or soft material so that the tray deformed by the pushers 260 and 540 is easily restored to its original shape in the ice separation process.

The transparent ice heater 430 may be disposed at a position adjacent to the second tray 380. The transparent ice heater 430 may be, for example, a wire type heater. For example, the transparent ice heater 430 may be installed to contact the second tray 380 or may be disposed at a position spaced a predetermined distance from the second tray 380. For another example, the second heater case 420 may not be separately provided, but the transparent heater 430 may be installed on the second tray case 400.

In any cases, the transparent ice heater 430 may supply heat to the second tray 380, and the heat supplied to the second tray 380 may be transferred to the ice making cell 320a.

The ice maker 200 may further include a driver 480 that provides driving force. The second tray 380 may relatively move with respect to the first tray 320 by receiving the driving force of the driver 480.

A through-hole 282 may be defined in an extension part 281 extending downward in one side of the first tray case 300. A through-hole 404 may be defined in the extension part 403 extending in one side of the second tray case 400. The ice maker 200 may further include a shaft 440 that passes through the through-holes 282 and 404 together.

A rotation arm 460 may be provided at each of both ends of the shaft 440. The shaft 440 may rotate by receiving rotational force from the driver 480.

One end of the rotation arm 460 may be connected to one end of the spring 402, and thus, a position of the rotation arm 460 may move to an initial value by restoring force when the spring 402 is tensioned.

The driver 480 may include a motor and a plurality of gears.

A full ice detection lever 520 may be connected to the driver 480. The full ice detection lever 520 may also rotate by the rotational force provided by the driver 480.

The full ice detection lever 520 may have a '⊏' shape as a whole. For example, the full ice detection lever 520 may include a first portion 521 and a pair of second portions 522 extending in a direction crossing the first portion 521 at both ends of the first portion 521. One of the pair of second portions 522 may be coupled to the driver 480, and the other may be coupled to the bracket 220 or the first tray case 300. The full ice detection lever 520 may rotate to detect ice stored in the ice bin 600.

The driver 480 may further include a cam that rotates by the rotational power of the motor.

The ice maker 200 may further include a sensor that senses the rotation of the cam.

For example, the cam is provided with a magnet, and the sensor may be a hall sensor detecting magnetism of the magnet during the rotation of the cam. The sensor may output first and second signals that are different outputs according to whether the sensor senses a magnet. One of the first signal and the second signal may be a high signal, and the other may be a low signal.

The controller 800 to be described later may determine a position of the second tray 380 based on the type and pattern of the signal outputted from the sensor. That is, since the second tray 380 and the cam rotate by the motor, the position of the second tray 380 may be indirectly determined based on a detection signal of the magnet provided in the cam.

For example, a water supply position and an ice making position, which will be described later, may be distinguished and determined based on the signals outputted from the sensor.

The ice maker 200 may further include a second pusher 540. The second pusher 540 may be installed on the bracket 220.

The second pusher 540 may include at least one extension part 544. For example, the second pusher 540 may include the extension part 544 provided with the same number as the number of ice making cells 320a, but is not limited thereto. The extension part 544 may push out the ice disposed in the ice making cell 320a. For example, the extension part 544 may pass through the second tray case 400 to contact the second tray 380 defining the ice making cell 320a and then press the contacting second tray 380. Therefore, the second tray case 400 may be provided with a hole 422 through which a portion of the second pusher 540 passes.

The first tray case 300 may be rotatably coupled to the second tray case 400 with respect to the shaft 440 and then be disposed to change in angle about the shaft 440.

In this embodiment, the second tray 380 may be made of a non-metal material. For example, when the second tray 380 is pressed by the second pusher 540, the second tray 380 may be made of a flexible or soft material which is deformable. Although not limited, the second tray 380 may be made of, for example, a silicone material.

Therefore, while the second tray 380 is deformed while the second tray 380 is pressed by the second pusher 540, pressing force of the second pusher 540 may be transmitted to ice. The ice and the second tray 380 may be separated from each other by the pressing force of the second pusher 540.

When the second tray 380 is made of the non-metal material and the flexible or soft material, the coupling force or attaching force between the ice and the second tray 380 may be reduced, and thus, the ice may be easily separated from the second tray 380.

Also, if the second tray 380 is made of the non-metal material and the flexible or soft material, after the shape of the second tray 380 is deformed by the second pusher 540, when the pressing force of the second pusher 540 is removed, the second tray 380 may be easily restored to its original shape.

On the other hand, the first tray 320 may be made of a metal material. In this case, since the coupling force or the separating force between the first tray 320 and the ice is strong, the ice maker 200 according to this embodiment may include at least one of the ice separation heater 290 or the first pusher 260.

For another example, the first tray 320 may be made of a non-metal material. When the first tray 320 is made of the non-metal material, the ice maker 200 may include only one of the ice separation heater 290 and the first pusher 260.

Alternatively, the ice maker 200 may not include the ice separation heater 290 and the first pusher 260.

Although not limited, the second tray 320 may be made of, for example, a silicone material.

That is, the first tray 320 and the second tray 380 may be made of the same material. When the first tray 320 and the second tray 380 are made of the same material, the first tray 320 and the second tray 380 may have different hardness to maintain sealing performance at the contact portion between the first tray 320 and the second tray 380.

In this embodiment, since the second tray 380 is pressed by the second pusher 540 to be deformed, the second tray 380 may have hardness less than that of the first tray 320 to facilitate the deformation of the second tray 380.

On the other hand, referring to FIG. 5, the ice maker 200 may further include a second temperature sensor (or a tray temperature sensor) 700 that senses the temperature of the ice making cell 320a. The second temperature sensor 700 may sense a temperature of water or ice of the ice making cell 320a.

The second temperature sensor 700 may be disposed adjacent to the first tray 320 to sense the temperature of the first tray 320, thereby indirectly determining the water temperature or the ice temperature of the ice making cell 320a. In this embodiment, the water temperature or the ice temperature of the ice making cell 320a may be referred to as an internal temperature of the ice making cell 320a.

The second temperature sensor 700 may be installed in the first tray case 300. In this case, the second temperature sensor 700 may contact the first tray 320, or may be spaced apart from the first tray 320 by a predetermined distance. Alternatively, the second temperature sensor 700 may be installed on the first tray 320 to contact the first tray 320.

Of course, when the second temperature sensor 700 is disposed to pass through the first tray 320, the temperature of water or ice of the ice making cell 320a may be directly sensed.

On the other hand, a portion of the ice separation heater 290 may be disposed higher than the second temperature sensor 700 and may be spaced apart from the second temperature sensor 700. An electric wire 701 coupled to the second temperature sensor 700 may be guided above the first tray case 300.

Referring to FIG. 6, the ice maker 200 according to this embodiment may be designed such that the position of the second tray 380 is different in the water supply position and the ice making position.

For example, the second tray 380 may include a second cell wall 381 defining the second cell 320c of the ice making cell 320a, and a circumferential wall 382 extending along the outer edge of the second cell wall 381.

The second cell wall 381 may include an upper surface 381a. In this specification, the upper surface 381a of the second cell wall 381 may be referred to as the upper surface 381a of the second tray 380. The upper surface 381a of the second cell wall 381 may be disposed lower than the upper end of the circumferential wall 381.

The first tray 320 may include a first cell wall 321a defining the first cell 320b of the ice making cell 320a. The first cell wall 321a may include a straight portion 321b and a curved portion 321c. The curved portion 321c may be formed in an arc shape having a center of the shaft 440 as a radius of curvature. Accordingly, the circumferential wall 381 may also include a straight portion and a curved portion corresponding to the straight portion 321b and the curved portion 321c.

The first cell wall 321a may include a lower surface 321d. In this specification, the lower surface 321b of the first cell wall 321a may be referred to as the lower surface 321b of the first tray 320.

The lower surface 321d of the first cell wall 321a may contact the upper surface 381a of the second cell wall 381a.

For example, at least a portion of the lower surface 321d of the first cell wall 321a and the upper surface 381a of the second cell wall 381 may be spaced apart at the water supply position as shown in FIG. 6. In FIG. 6, for example, it is shown that the lower surface 321d of the first cell wall 321a and the entire upper surface 381a of the second cell wall 381 are spaced apart from each other.

Accordingly, the upper surface 381a of the second cell wall 381 may be inclined to form a predetermined angle with the lower surface 321d of the first cell wall 321a.

Although not limited, the lower surface 321d of the first cell wall 321a at the water supply position may be maintained substantially horizontally, and the upper surface 381a of the second cell wall 381 may be disposed to be inclined with respect to the lower surface 321d of the first cell wall 321a under the first cell wall 321a.

In the state shown in FIG. 6, the circumferential wall 382 may surround the first cell wall 321a. In addition, the upper end of the circumferential wall 382 may be disposed higher than the lower surface 321d of the first cell wall 321a.

Figure 12:
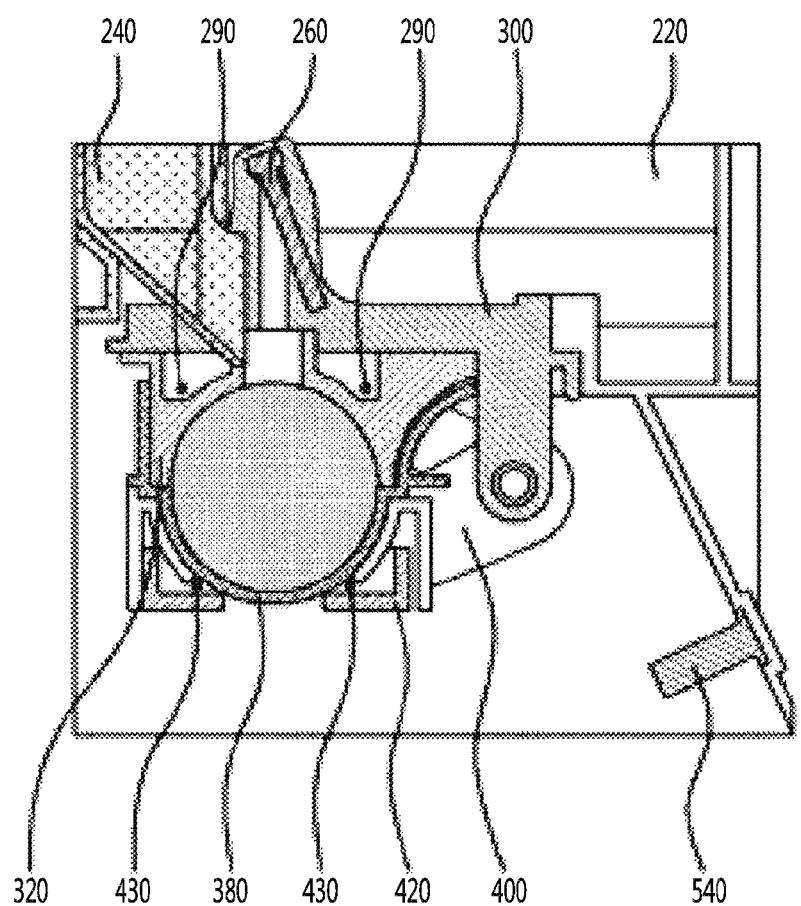
FIG. 12 is a view illustrating a state in which ice is made at an ice making position.

On the other hand, the upper surface 381a of the second cell wall 381 may contact at least a portion of the lower surface 321d of the first cell wall 321a at the ice making position (see FIG. 12).

The angle formed by the upper surface 381a of the second tray 380 and the lower surface 321d of the first tray 320 at the ice making position is smaller than the angle formed by the upper surface 382a of the second tray 380 and the lower surface 321d of the first tray 320 at the water supply position.

The upper surface 381a of the second cell wall 381 may contact the entire lower surface 321d of the first cell wall 321a at the ice making position. At the ice making position, the upper surface 381a of the second cell wall 381 and the lower surface 321d of the first cell wall 321a may be disposed to be substantially horizontal.

In this embodiment, the water supply position of the second tray 380 and the ice making position are different from each other so that, when the ice maker 200 includes a plurality of ice making cells 320a, a water passage for communication between the ice making cells 320a is not formed in the first tray 320 and/or the second tray 380, and water is uniformly distributed to the plurality of ice making cells 320a.

If the ice maker 200 includes the plurality of ice making cells 320a, when the water passage is formed in the first tray 320 and/or the second tray 380, the water supplied to the ice maker 200 is distributed to the plurality of ice making cells 320a along the water passage.

However, in a state in which the water is distributed to the plurality of ice making cells 320a, water also exists in the water passage, and when ice is made in this state, the ice made in the ice making cell 320a is connected by the ice made in the water passage.

In this case, there is a possibility that the ice will stick together even after the ice separation is completed. Even if pieces of ice are separated from each other, some pieces of ice will contain ice made in the water passage, and thus there is a problem that the shape of the ice is different from that of the ice making cell.

However, as in this embodiment, when the second tray 380 is spaced apart from the first tray 320 at the water supply position, water falling into the second tray 380 may be uniformly distributed to the plurality of second cells 320c of the second tray 380.

For example, the first tray 320 may include a communication hole 321e. When the first tray 320 includes one first cell 320b, the first tray 320 may include one communication hole 321e.

When the first tray 320 includes a plurality of first cells 320b, the first tray 320 may include a plurality of communication holes 321e. The water supply part 240 may supply water to one communication hole 321e among the plurality of communication holes 321e. In this case, the water supplied through the one communication hole 321e falls into the second tray 380 after passing through the first tray 320.

During the water supply process, water may fall into any one second cell 320c among the plurality of second cells 320c of the second tray 380. The water supplied to one second cell 320c overflows from one second cell 320c.

In this embodiment, since the upper surface 381a of the second tray 380 is spaced apart from the lower surface 321d of the first tray 320, the water that overflows from one of the second cells 320c moves to another adjacent second cell 320c along the upper surface 381a of the second tray 380. Accordingly, the plurality of second cells 320c of the second tray 380 may be filled with water.

In addition, in a state in which the supply of water is completed, a portion of the supplied water is filled in the second cell 320c, and another portion of the supplied water may be filled in a space between the first tray 320 and the second tray 380.

Figure 11:
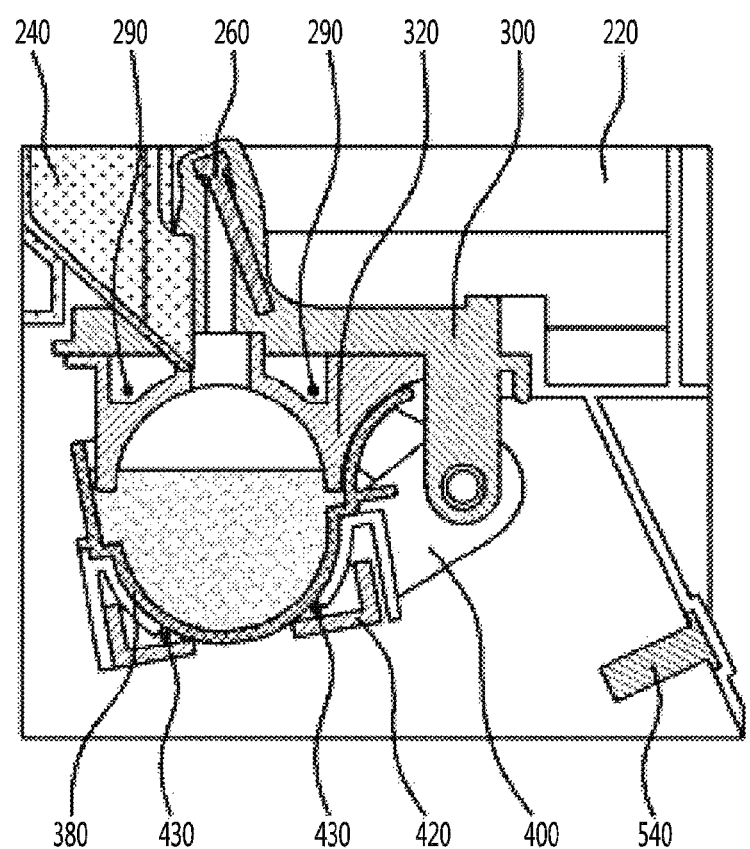
FIG. 11 is a view illustrating a state in which supply of water is completed at a water supply position.

Water at the water supply position when water supply is completed may be positioned only in the space between the first tray 320 and the second tray 380, the space between the first tray 320 and the second tray 380, and the first tray 320 according to the volume of the ice making cell 320a (see FIG. 11).

When the second tray 380 moves from the water supply position to the ice making position, the water in the space between the first tray 320 and the second tray 380 may be uniformly distributed to the plurality of first cells 320b.

On the other hand, when the water passage is defined in the first tray 320 and/or the second tray 380, ice made in the ice making cell 320a is also made in the water passage portion.

In this case, when the controller of the refrigerator controls one or more of the cooling power of the cooling air supply part 900 and the heating amount of the transparent ice heater 430 to vary according to the mass per unit height of water in the ice making cell 320a in order to make transparent ice, one or more of the cooling power of the cold air supply part 900 and the heating amount of the transparent ice heater 430 are controlled to rapidly vary several times or more in the portion where the water passage is defined.

This is because the mass per unit height of water is rapidly increased several times or more in the portion where the water passage is defined. In this case, since the reliability problem of the parts may occur and expensive parts with large widths of maximum and minimum output may be used, it can also be disadvantageous in terms of power consumption and cost of parts. As a result, the present disclosure may require a technology related to the above-described ice making position so as to make transparent ice.

Figure 7:
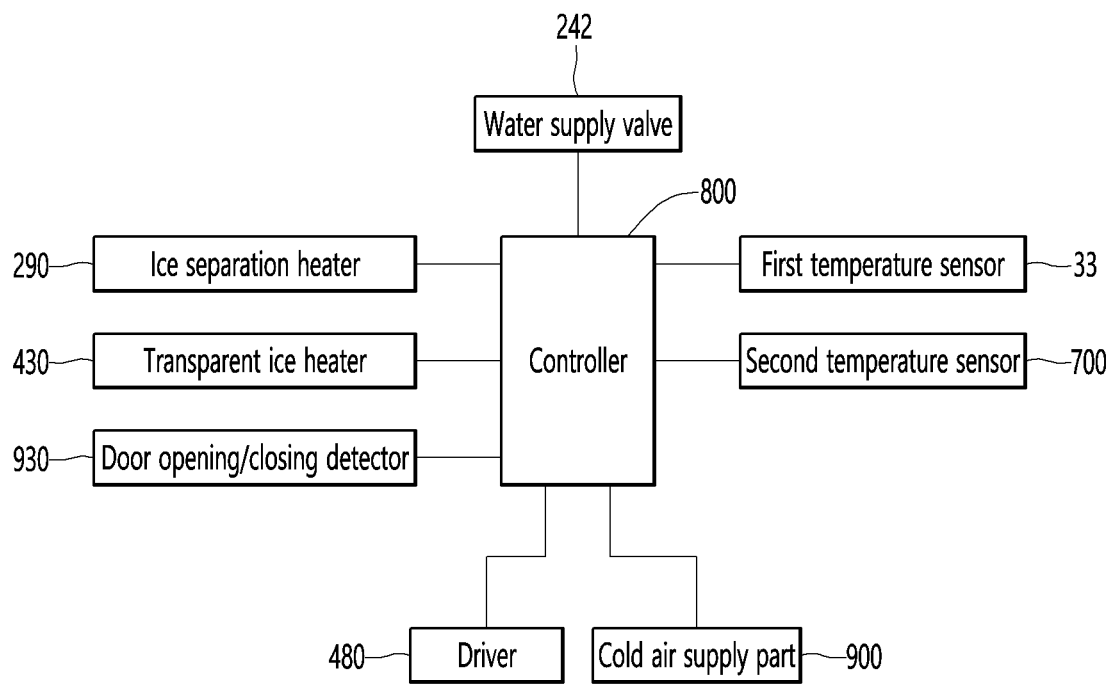
FIG. 7 is a block diagram illustrating a control of a refrigerator according to an embodiment.

FIG. 7 is a block diagram illustrating a control of a refrigerator according to an embodiment.

Referring to FIG. 7, the refrigerator according to this embodiment may further include a cold air supply part 900 supplying cold air to the freezing compartment 32 (or the ice making cell). The cold air supply part 900 may supply cold air to the freezing compartment 32 using a refrigerant cycle.

For example, the cold air supply part 900 may include a compressor compressing the refrigerant. A temperature of the cold air supplied to the freezing compartment 32 may vary according to the output (or frequency) of the compressor. Alternatively, the cold air supply part 900 may include a fan blowing air to an evaporator. An amount of cold air supplied to the freezing compartment 32 may vary according to the output (or rotation rate) of the fan. Alternatively, the cold air supply part 900 may include a refrigerant valve controlling an amount of refrigerant flowing through the refrigerant cycle. An amount of refrigerant flowing through the refrigerant cycle may vary by adjusting an opening degree by the refrigerant valve, and thus, the temperature of the cold air supplied to the freezing compartment 32 may vary.

Therefore, in this embodiment, the cold air supply part 900 may include one or more of the compressor, the fan, and the refrigerant valve.

The refrigerator according to this embodiment may further include a controller 800 that controls the cold air supply part 900.

The refrigerator may further include a water supply valve 242 controlling an amount of water supplied through the water supply part 240. The refrigerator may further include a door opening/closing detector 930 detecting a door opening/closing of a storage chamber (for example, the freezing compartment 32) in which the ice maker 200 is installed.

The controller 800 may control a portion or all of the ice separation heater 290, the transparent ice heater 430, the driver 480, the cold air supply part 900, and the water supply valve 242.

When the door opening/closing detector 930 detects the opening/closing of the door (a state in which the door is opened or closed), the controller 800 may determine whether to vary the cooling power of the cooling air supply part 900 based on the temperature sensed by the first temperature sensor 33.

When the door opening/closing detector 930 detects the opening/closing of the door, the controller 800 may determine whether to vary the output of the transparent ice heater 430 based on the temperature sensed by the second temperature sensor 700.

On the other hand, in this embodiment, when the ice maker 200 includes both the ice separation heater 290 and the transparent ice heater 430, an output of the ice separation heater 290 and an output of the transparent ice heater 430 may be different from each other. When the outputs of the ice separation heater 290 and the transparent ice heater 430 are different from each other, an output terminal of the ice separation heater 290 and an output terminal of the transparent ice heater 430 may be provided in different shapes, incorrect connection of the two output terminals may be prevented.

Although not limited, the output of the ice separation heater 290 may be set larger than that of the transparent ice heater 430. Accordingly, ice may be quickly separated from the first tray 320 by the ice separation heater 290.

In this embodiment, when the ice separation heater 290 is not provided, the transparent ice heater 430 may be disposed at a position adjacent to the second tray 380 described above or be disposed at a position adjacent to the first tray 320.

The refrigerator may further include a first temperature sensor 33 (or an internal temperature sensor) that senses a temperature of the freezing compartment 32.

The controller 800 may control the cold air supply part 900 based on the temperature sensed by the first temperature sensor 33.

The controller 800 may determine whether ice making is completed based on the temperature sensed by the second temperature sensor 700.

Figure 8:
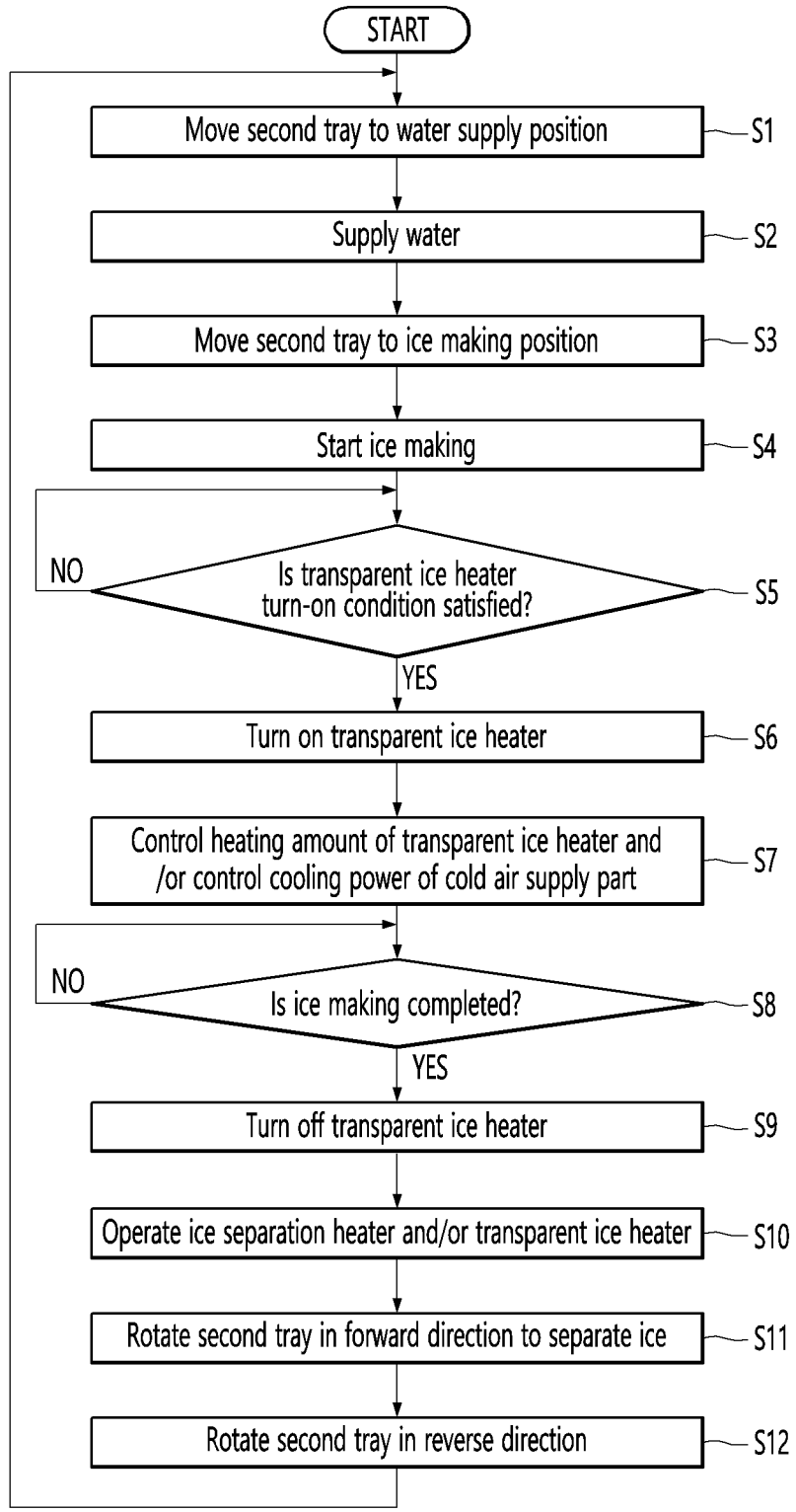
FIG. 8 is a flowchart for explaining a process of making ice in the ice maker according to an embodiment.

FIG. 8 is a flowchart for explaining a process of making ice in the ice maker according to an embodiment.

Figure 9:
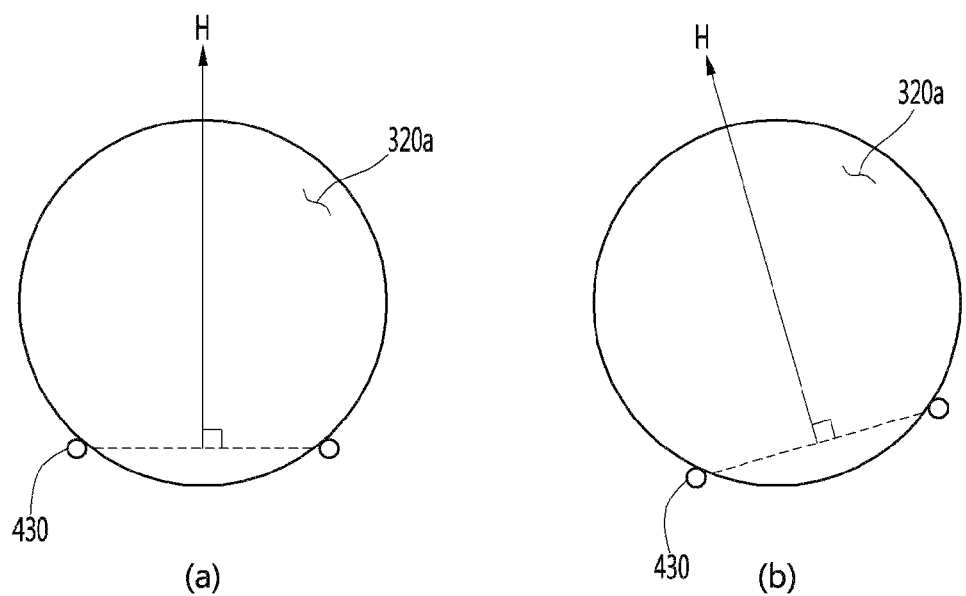
FIG. 9(a)-(b) is a view for explaining a height reference depending on a relative position of the transparent heater with respect to the ice making cell.

FIG. 9(a)-(b) is a view for explaining a height reference depending on a relative position of the transparent heater with respect to the ice making cell, and FIG. 10(a)-(b) is a view for explaining an output of the transparent heater per unit height of water within the ice making cell.

Figure 13:
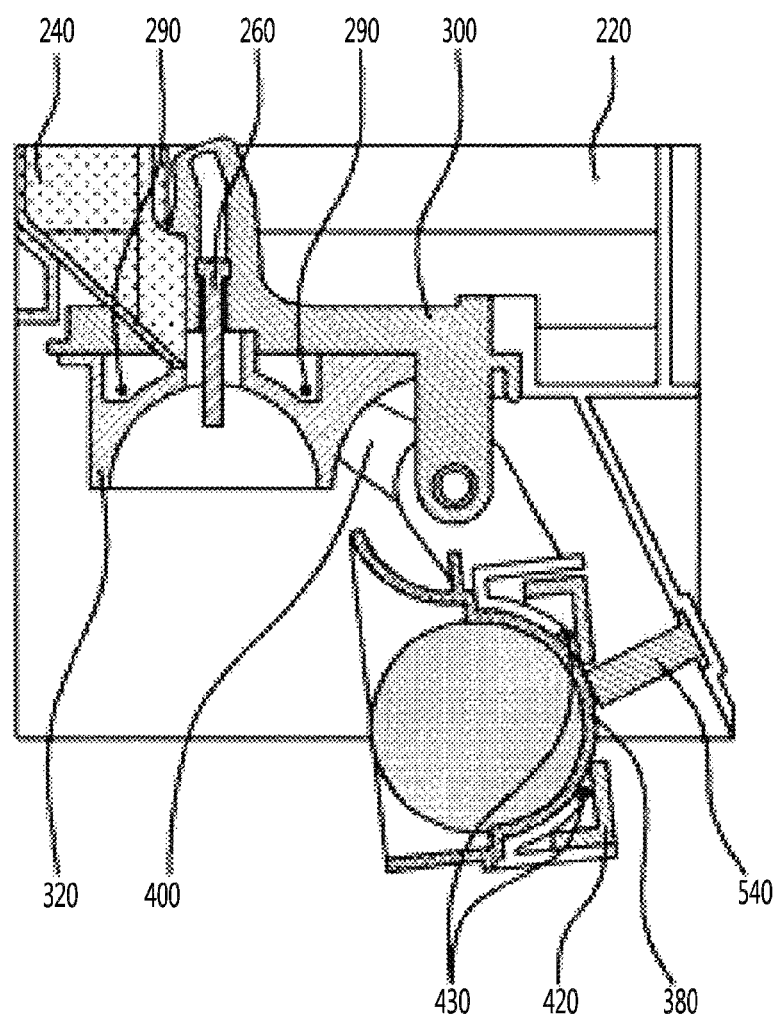
FIG. 13 is a view illustrating a state in which a second tray is separated from a first tray during an ice separation process.
Figure 14:
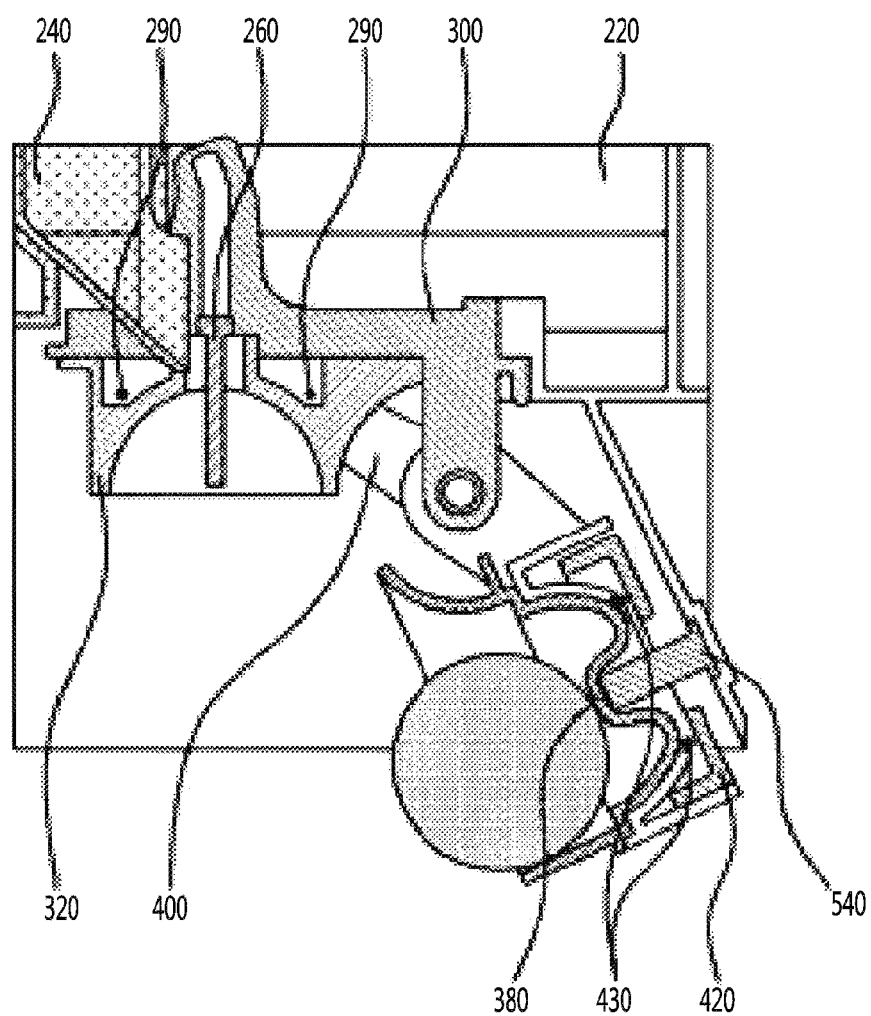
FIG. 14 is a view illustrating a state in which a second tray is moved to an ice separation position during an ice separation process.

FIG. 11 is a view illustrating a state in which supply of water is completed at a water supply position, FIG. 12 is a view illustrating a state in which ice is made at an ice making position, FIG. 13 is a view illustrating a state in which a second tray is separated from a first tray during an ice separation process, and FIG. 14 is a view illustrating a state in which a second tray is moved to an ice separation position during an ice separation process.

Referring to FIGS. 6 to 14, to make ice in the ice maker 200, the controller 800 moves the second tray 380 to a water supply position (S1).

In this specification, a direction in which the second tray 380 moves from the ice making position of FIG. 12 to the ice separation position of FIG. 14 may be referred to as forward movement (or forward rotation). On the other hand, the direction from the ice separation position of FIG. 14 to the water supply position of FIG. 11 may be referred to as reverse movement (or reverse rotation).

The movement to the water supply position of the second tray 380 is detected by a sensor, and when it is detected that the second tray 380 moves to the water supply position, the controller 800 stops the driver 480.

The water supply starts when the second tray 380 moves to the water supply position (S2). For the water supply, the controller 800 may turn on the water supply valve 242, and when it is determined that a predetermined amount of water is supplied, the controller 800 may turn off the water supply valve 242. For example, in the process of supplying water, when a pulse is outputted from a flow rate sensor (not shown) and the outputted pulse reaches a reference pulse, it may be determined that a predetermined amount of water is supplied.

After the water supply is completed, the controller 800 controls the driver 480 to allow the second tray 380 to move to the ice making position (S3). For example, the controller 800 may control the driver 480 to allow the second tray 380 to move from the water supply position in the reverse direction.

When the second tray 380 move in the reverse direction, the upper surface 381a of the second tray 380 comes close to the lower surface 321e of the first tray 320. Then, water between the upper surface 381a of the second tray 380 and the lower surface 321e of the first tray 320 is divided into each of the plurality of second cells 320c and then is distributed. When the upper surface 381a of the second tray 380 and the lower surface 321e of the first tray 320 are completely in close contact, the first cell 320b is filled with water.

The movement to the ice making position of the second tray 380 is detected by a sensor, and when it is detected that the second tray 380 moves to the ice making position, the controller 800 stops the driver 480.

In the state in which the second tray 380 moves to the ice making position, ice making is started (S4). For example, the ice making may be started when the second tray 380 reaches the ice making position. Alternatively, when the second tray 380 reaches the ice making position, and the water supply time elapses, the ice making may be started.

When ice making is started, the controller 800 may control the cold air supply part 900 to supply cold air to the ice making cell 320a.

After the ice making is started, the controller 800 may control the transparent ice heater 430 to be turned on in at least partial sections of the cold air supply part 900 supplying the cold air to the ice making cell 320a.

When the transparent ice heater 430 is turned on, since the heat of the transparent ice heater 430 is transferred to the ice making cell 320a, the ice making rate of the ice making cell 320a may be delayed.

According to this embodiment, the ice making rate may be delayed so that the bubbles dissolved in the water inside the ice making cell 320a move from the portion at which ice is made toward the liquid water by the heat of the transparent ice heater 430 to make the transparent ice in the ice maker 200.

In the ice making process, the controller 800 may determine whether the turn-on condition of the transparent ice heater 430 is satisfied (S5).

In this embodiment, the transparent ice heater 430 is not turned on immediately after the ice making is started, and the transparent ice heater 430 may be turned on only when the turn-on condition of the transparent ice heater 430 is satisfied (S6).

Generally, the water supplied to the ice making cell 320a may be water having normal temperature or water having a temperature lower than the normal temperature. The temperature of the water supplied is higher than a freezing point of water. Thus, after the water supply, the temperature of the water is lowered by the cold air, and when the temperature of the water reaches the freezing point of the water, the water is changed into ice.

In this embodiment, the transparent ice heater 430 may not be turned on until the water is phase-changed into ice.

If the transparent ice heater 430 is turned on before the temperature of the water supplied to the ice making cell 320a reaches the freezing point, the speed at which the temperature of the water reaches the freezing point by the heat of the transparent ice heater 430 is slow. As a result, the starting of the ice making may be delayed.

The transparency of the ice may vary depending on the presence of the air bubbles in the portion at which ice is made after the ice making is started. If heat is supplied to the ice making cell 320a before the ice is made, the transparent ice heater 430 may operate regardless of the transparency of the ice.

Thus, according to this embodiment, after the turn-on condition of the transparent ice heater 430 is satisfied, when the transparent ice heater 430 is turned on, power consumption due to the unnecessary operation of the transparent ice heater 430 may be prevented.

Alternatively, even if the transparent ice heater 430 is turned on immediately after the start of ice making, since the transparency is not affected, it is also possible to turn on the transparent ice heater 430 after the start of the ice making.

In this embodiment, the controller 800 may determine that the turn-on condition of the transparent ice heater 430 is satisfied when a predetermined time elapses from the set specific time point. The specific time point may be set to at least one of the time points before the transparent ice heater 430 is turned on. For example, the specific time point may be set to a time point at which the cold air supply part 900 starts to supply cooling power for the ice making, a time point at which the second tray 380 reaches the ice making position, a time point at which the water supply is completed, and the like.

Alternatively, the controller 800 determines that the turn-on condition of the transparent ice heater 430 is satisfied when a temperature sensed by the second temperature sensor 700 reaches a turn-on reference temperature.

For example, the turn-on reference temperature may be a temperature for determining that water starts to freeze at the uppermost side (communication hole side) of the ice making cell 320a. When a portion of the water is frozen in the ice making cell 320a, the temperature of the ice in the ice making cell 320a is below zero.

The temperature of the first tray 320 may be higher than the temperature of the ice in the ice making cell 320a.

Alternatively, although water is present in the ice making cell 320a, after the ice starts to be made in the ice making cell 320a, the temperature sensed by the second temperature sensor 700 may be below zero.

Thus, to determine that making of ice is started in the ice making cell 320a on the basis of the temperature detected by the second temperature sensor 700, the turn-on reference temperature may be set to the below-zero temperature.

That is, when the temperature sensed by the second temperature sensor 700 reaches the turn-on reference temperature, since the turn-on reference temperature is below zero, the ice temperature of the ice making cell 320a is below zero, i.e., lower than the turn-on reference temperature. Therefore, it may be indirectly determined that ice is made in the ice making cell 320a.

As described above, when the transparent ice heater 430 is not used, the heat of the transparent ice heater 430 is transferred into the ice making cell 320a.

In this embodiment, when the second tray 380 is disposed below the first tray 320, the transparent ice heater 430 is disposed to supply the heat to the second tray 380, the ice may be made from an upper side of the ice making cell 320a.

In this embodiment, since ice is made from the upper side in the ice making cell 320a, the bubbles move downward from the portion at which the ice is made in the ice making cell 320a toward the liquid water.

Since density of water is greater than that of ice, water or bubbles may convex in the ice making cell 320a, and the bubbles may move to the transparent ice heater 430.

In this embodiment, the mass (or volume) per unit height of water in the ice making cell 320a may be the same or different according to the shape of the ice making cell 320a.

For example, when the ice making cell 320a is a rectangular parallelepiped, the mass (or volume) per unit height of water in the ice making cell 320a is the same. On the other hand, when the ice making cell 320a has a shape such as a sphere, an inverted triangle, a crescent moon, etc., the mass (or volume) per unit height of water is different.

When the cooling power of the cold air supply part 900 is constant, if the heating amount of the transparent ice heater 430 is the same, since the mass per unit height of water in the ice making cell 320a is different, an ice making rate per unit height may be different.

For example, if the mass per unit height of water is small, the ice making rate is high, whereas if the mass per unit height of water is high, the ice making rate is slow.

As a result, the ice making rate per unit height of water is not constant, and thus, the transparency of the ice may vary according to the unit height. In particular, when ice is made at a high rate, the bubbles may not move from the ice to the water, and the ice may contain the bubbles to lower the transparency.

That is, the more the variation in ice making rate per unit height of water decreases, the more the variation in transparency per unit height of made ice may decrease.

Therefore, in this embodiment, the controller 800 may control the cooling power and/or the heating amount so that the cooling power of the cold air supply part 900 and/or the heating amount of the transparent ice heater 430 is variable according to the mass per unit height of the water of the ice making cell 320a.

In this specification, the cooling power of the cold air supply part 900 may include one or more of a variable output of the compressor, a variable output of the fan, and a variable opening degree of the refrigerant valve.

Also, in this specification, the variation in the heating amount of the transparent ice heater 430 may represent varying the output of the transparent ice heater 430 or varying the duty of the transparent ice heater 430.

In this case, the duty of the transparent ice heater 430 represents a ratio of the turn-on time and a sum of the turn-on time and the turn-off time of the transparent ice heater 430 in one cycle, or a ratio of the turn-off time and a sum of the turn-on time and the turn-off time of the transparent ice heater 430 in one cycle.

In this specification, a reference of the unit height of water in the ice making cell 320a may vary according to a relative position of the ice making cell 320a and the transparent ice heater 430.

For example, as shown in FIG. 9(a), the transparent ice heater 430 at the bottom surface of the ice making cell 320a may be disposed to have the same height.

In this case, a line connecting the transparent ice heater 430 is a horizontal line, and a line extending in a direction perpendicular to the horizontal line serves as a reference for the unit height of the water of the ice making cell 320a.

In the case of FIG. 9(a), ice is made from the uppermost side of the ice making cell 320a and then is grown. On the other hand, as shown in FIG. 9(b), the transparent ice heater 430 at the bottom surface of the ice making cell 320a may be disposed to have different heights.

In this case, since heat is supplied to the ice making cell 320a at different heights of the ice making cell 320a, ice is made with a pattern different from that of FIG. 9(a).

For example, in FIG. 9(b), ice may be made at a position spaced apart from the uppermost side to the left side of the ice making cell 320a, and the ice may be grown to a right lower side at which the transparent ice heater 430 is disposed.

Accordingly, in FIG. 9(b), a line (reference line) perpendicular to the line connecting two points of the transparent ice heater 430 serves as a reference for the unit height of water of the ice making cell 320a. The reference line of FIG. 9(b) is inclined at a predetermined angle from the vertical line.

FIG. 10(a)-(b) illustrates a unit height division of water and an output amount of transparent ice heater per unit height when the transparent ice heater is disposed as shown in FIG. 9(a).

Hereinafter, an example of controlling an output of the transparent ice heater so that the ice making rate is constant for each unit height of water will be described.

Figure 10:
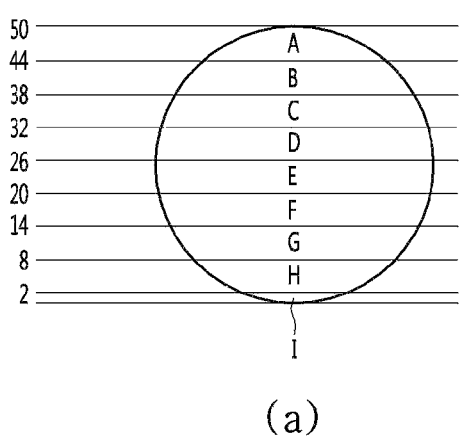
FIG. 10(a)-(b) is a view for explaining an output of the transparent heater per unit height of water within the ice making cell.
Figure 10:
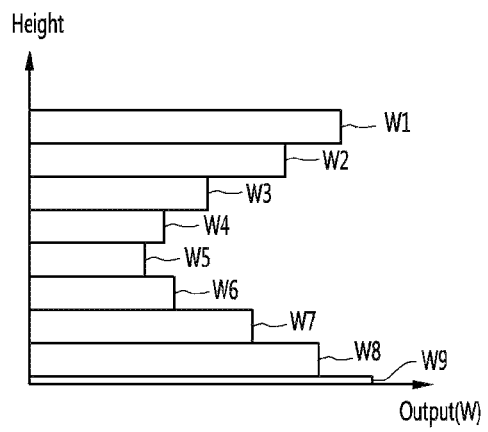

Referring to FIG. 10, when the ice making cell 320a is formed, for example, in a spherical shape, the mass per unit height of water in the ice making cell 320a increases from the upper side to the lower side to reach the maximum and then decreases again.

For example, the water (or the ice making cell itself) in the spherical ice making cell 320a having a diameter of about 50 mm is divided into nine sections (section A to section I) by 6 mm height (unit height). Here, it is noted that there is no limitation on the size of the unit height and the number of divided sections.

When the water in the ice making cell 320a is divided into unit heights, the height of each section to be divided is equal to the section A to the section H, and the section I is lower than the remaining sections. Alternatively, the unit heights of all divided sections may be the same depending on the diameter of the ice making cell 320a and the number of divided sections.

Among the many sections, the section E is a section in which the mass of unit height of water is maximum. For example, in the section in which the mass per unit height of water is maximum, when the ice making cell 320a has spherical shape, a diameter of the ice making cell 320a, a horizontal cross-sectional area of the ice making cell 320a, or a circumference of the ice may be maximum.

As described above, when assuming that the cooling power of the cold air supply part 900 is constant, and the output of the transparent ice heater 430 is constant, the ice making rate in section E is the lowest, the ice making rate in the sections A and I is the fastest.

In this case, since the ice making rate varies for the height, the transparency of the ice may vary for the height. In a specific section, the ice making rate may be too fast to contain bubbles, thereby lowering the transparency.

Therefore, in this embodiment, the output of the transparent ice heater 430 may be controlled so that the ice making rate for each unit height is the same or similar while the bubbles move from the portion at which ice is made to the water in the ice making process.

Specifically, since the mass of the section E is the largest, the output W5 of the transparent ice heater 430 in the section E may be set to a minimum value. Since the volume of the section D is less than that of the section E, the volume of the ice may be reduced as the volume decreases, and thus it is necessary to delay the ice making rate. Thus, an output W6 of the transparent ice heater 430 in the section D may be set to a value greater than an output W5 of the transparent ice heater 430 in the section E.

Since the volume in the section C is less than that in the section D by the same reason, an output W3 of the transparent ice heater 430 in the section C may be set to a value greater than the output W4 of the transparent ice heater 430 in the section D. Since the volume in the section B is less than that in the section C, an output W2 of the transparent ice heater 430 in the section B may be set to a value greater than the output W3 of the transparent ice heater 430 in the section C. Since the volume in the section A is less than that in the section B, an output W1 of the transparent ice heater 430 in the section A may be set to a value greater than the output W2 of the transparent ice heater 430 in the section B.

For the same reason, since the mass per unit height decreases toward the lower side in the section E, the output of the transparent ice heater 430 may increase as the lower side in the section E (see W6, W7, W8, and W9).

Thus, according to an output variation pattern of the transparent ice heater 430, the output of the transparent ice heater 430 is gradually reduced from the first section to the intermediate section after the transparent ice heater 430 is initially turned on.

The output of the transparent ice heater 430 may be minimum in the intermediate section in which the mass of unit height of water is minimum. The output of the transparent ice heater 430 may again increase step by step from the next section of the intermediate section.

The transparency of the ice may be uniform for each unit height, and the bubbles may be collected in the lowermost section by the output control of the transparent ice heater 430. Thus, when viewed on the ice as a whole, the bubbles may be collected in the localized portion, and the remaining portion may become totally transparent.

As described above, even if the ice making cell 320a does not have the spherical shape, the transparent ice may be made when the output of the transparent ice heater 430 varies according to the mass for each unit height of water in the ice making cell 320a.

The heating amount of the transparent ice heater 430 when the mass for each unit height of water is large may be less than that of the transparent ice heater 430 when the mass for each unit height of water is small.

For example, while maintaining the same cooling power of the cold air supply part 900, the heating amount of the transparent ice heater 430 may vary so as to be inversely proportional to the mass per unit height of water.

Also, it is possible to make the transparent ice by varying the cooling power of the cold air supply part 900 according to the mass per unit height of water.

For example, when the mass per unit height of water is large, the cold force of the cold air supply part 900 may increase, and when the mass per unit height is small, the cold force of the cold air supply part 900 may decrease.

For example, while maintaining a constant heating amount of the transparent ice heater 430, the cooling power of the cold air supply part 900 may vary to be proportional to the mass per unit height of water.

Referring to the variable cooling power pattern of the cold air supply part 900 in the case of making the spherical ice, the cooling power of the cold air supply part 900 from the initial section to the intermediate section during the ice making process may gradually increase.

The cooling power of the cold air supply part 900 may be maximum in the intermediate section in which the mass for each unit height of water is minimum. The cooling power of the cold air supply part 900 may be gradually reduced again from the next section of the intermediate section.

Alternatively, the transparent ice may be made by varying the cooling power of the cold air supply part 900 and the heating amount of the transparent ice heater 430 according to the mass for each unit height of water.

For example, the heating power of the transparent ice heater 430 may vary so that the cooling power of the cold air supply part 900 is proportional to the mass per unit height of water and inversely proportional to the mass for each unit height of water.

According to this embodiment, when one or more of the cooling power of the cold air supply part 900 and the heating amount of the transparent ice heater 430 are controlled according to the mass per unit height of water, the ice making rate per unit height of water may be substantially the same or may be maintained within a predetermined range.

The controller 800 may determine whether the ice making is completed based on the temperature sensed by the second temperature sensor 700 (S8). When it is determined that the ice making is completed, the controller 800 may turn off the transparent ice heater 430 (S9).

For example, when the temperature sensed by the second temperature sensor 700 reaches a first reference temperature, the controller 800 may determine that the ice making is completed to turn off the transparent ice heater 430.

In this case, a distance between the second temperature sensor 700 and each ice making cell 320a is different. Thus, in order to determine that the ice making is completed in all the ice making cells 320a, the controller 800 may perform the ice separation after a certain amount of time, at which it is determined that ice making is completed, has passed or when the temperature sensed by the second temperature sensor 700 reaches a second reference temperature lower than the first reference temperature.

When the ice making is completed, the controller 800 operates one or more of the ice separation heater 290 and the transparent ice heater 430 (S10).

When at least one of the ice separation heater 290 or the transparent ice heater 430 is turned on, heat of the heater is transferred to at least one of the first tray 320 or the second tray 380 so that the ice may be separated from the surfaces (inner surfaces) of one or more of the first tray 320 and the second tray 380.

Also, the heat of the heaters 290 and 430 is transferred to the contact surface of the first tray 320 and the second tray 380, and thus, the lower surface 321d of the first tray 320 and the upper surface 381a of the second tray 380 may be in a state capable of being separated from each other.

When at least one of the ice separation heater 290 and the transparent ice heater 430 operate for a predetermined time, or when the temperature sensed by the second temperature sensor 700 is equal to or higher than an off reference temperature, the controller 800 is turned off the heaters 290 and 430, which are turned on (S10). Although not limited, the turn-off reference temperature may be set to below zero temperature.

The controller 800 operates the driver 480 to allow the second tray 380 to move in the forward direction (S11).

As illustrated in FIG. 13, when the second tray 380 moves in the forward direction, the second tray 380 is spaced apart from the first tray 320.

The moving force of the second tray 380 is transmitted to the first pusher 260 by the pusher link 500. Then, the first pusher 260 descends along the guide slot 302, and the extension part 264 passes through the communication hole 321e to press the ice in the ice making cell 320a.

In this embodiment, ice may be separated from the first tray 320 before the extension part 264 presses the ice in the ice making process. That is, ice may be separated from the surface of the first tray 320 by the heater that is turned on. In this case, the ice may move together with the second tray 380 while the ice is supported by the second tray 380.

For another example, even when the heat of the heater is applied to the first tray 320, the ice may not be separated from the surface of the first tray 320.

Therefore, when the second tray 380 moves in the forward direction, there is possibility that the ice is separated from the second tray 380 in a state in which the ice contacts the first tray 320.

In this state, in the process of moving the second tray 380, the extension part 264 passing through the communication hole 320e may press the ice contacting the first tray 320, and thus, the ice may be separated from the tray 320.

The ice separated from the first tray 320 may be supported by the second tray 380 again.

When the ice moves together with the second tray 380 while the ice is supported by the second tray 380, the ice may be separated from the tray 250 by its own weight even if no external force is applied to the second tray 380.

While the second tray 380 moves, even if the ice does not fall from the second tray 380 by its own weight, when the second pusher 540 presses the second tray 380 as illustrated in FIG. 13, the ice may be separated from the second tray 380 to fall downward.

Specifically, as illustrated in FIG. 13, while the second tray 380 moves, the second tray 380 may contact the extension part 544 of the second pusher 540. When the second tray 380 continuously moves in the forward direction, the extension part 544 may press the second tray 380 to deform the second tray 380. Thus, the pressing force of the extension part 544 may be transferred to the ice so that the ice is separated from the surface of the second tray 380. The ice separated from the surface of the second tray 380 may drop downward and be stored in the ice bin 600.

In this embodiment, as shown in FIG. 14, the position at which the second tray 380 is pressed by the second pusher 540 and deformed may be referred to as an ice separation position.

Whether the ice bin 600 is full may be detected while the second tray 380 moves from the ice making position to the ice separation position.

For example, the full ice detection lever 520 rotates together with the second tray 380, and the rotation of the full ice detection lever 520 is interrupted by ice while the full ice detection lever 520 rotates. In this case, it may be determined that the ice bin 600 is in a full ice state. On the other hand, if the rotation of the full ice detection lever 520 is not interfered with the ice while the full ice detection lever 520 rotates, it may be determined that the ice bin 600 is not in the ice state.

After the ice is separated from the second tray 380, the controller 800 controls the driver 480 to allow the second tray 380 to move in the reverse direction (S11). Then, the second tray 380 moves from the ice separation position to the water supply position.

When the second tray 380 moves to the water supply position of FIG. 6, the controller 800 stops the driver 480 (S1).

When the second tray 380 is spaced apart from the extension part 544 while the second tray 380 moves in the reverse direction, the deformed second tray 380 may be restored to its original shape.

In the reverse movement of the second tray 380, the moving force of the second tray 380 is transmitted to the first pusher 260 by the pusher link 500, and thus, the first pusher 260 ascends, and the extension part 264 is removed from the ice making cell 320a.

On the other hand, in this embodiment, cooling power of the cold air supply part 900 may be determined corresponding to the target temperature of the freezing compartment 32. The cold air generated by the cold air supply part 900 may be supplied to the freezing compartment 32.

The water of the ice making cell 320a may be phase-changed into ice by heat transfer between the cold water supplied to the freezing compartment 32 and the water of the ice making cell 320a.

In this embodiment, a heating amount of the transparent ice heater 430 for each unit height of water may be determined in consideration of predetermined cooling power of the cold air supply part 900.

The heating amount (or output) of the transparent ice heater 430 determined in consideration of the predetermined cooling power of the cold air supply part 900 is referred to as a reference heating amount (or reference output). The magnitude of the reference heating amount per unit height of water is different.

However, when the amount of heat transfer between the cold of the freezing compartment 32 and the water in the ice making cell 320a is variable, if the heating amount of the transparent ice heater 430 is not adjusted to reflect this, the transparency of ice for each unit height varies.

In this embodiment, the case in which the heat transfer amount between the cold and the water increase may be a case in which the cooling power of the cold air supply part 900 increases or a case in which the air having a temperature lower than the temperature of the cold air in the freezing compartment 32 is supplied to the freezing compartment 32.

On the other hand, for example, the case in which the heat transfer amount of cold air and water decreases may be a case in which the cooling power of the cold air supply part 900 decreases, a case in which the door is opened and air having a temperature higher than the temperature of the cold air in the freezing compartment 32 is supplied to the freezing compartment 32, a case in which food having a temperature higher than the temperature of the cold air in the freezing compartment 32 is added to the freezing compartment 32, or a case in which a defrosting heater (not shown) defrosting an evaporator is turned on.

For example, the cooling power of the cold air supply part 900 may increase when a target temperature of the freezing compartment 32 is lowered, when an operation mode of the freezing compartment 32 is changed from a normal mode to a rapid cooling mode, when an output of at least one of the compressor or the fan increases, or when an opening degree increases.

On the other hand, the cooling power of the cold air supply part 900 may decrease when the target temperature of the freezing compartment 32 increases, when the operation mode of the freezing compartment 32 is changed from the rapid cooling mode to the normal mode, when the output of at least one of the compressor or the fan decreases, or when the opening degree of the refrigerant valve decreases.

When the heat transfer amount of the cold air and the water increases, the temperature of the cold air around the ice maker 200 is lowered to increase in ice making rate.

On the other hand, if the heat transfer amount of the cold air and the water decreases, the temperature of the cold air around the ice maker 200 increases, the ice making rate decreases, and the ice making time increases.

Therefore, in this embodiment, when the amount of heat transfer of cold and water increases so that the ice making rate is maintained within a predetermined range lower than the ice making rate when the ice making is performed with the transparent ice heater 430 that is turned off, the heating amount of transparent ice heater 430 may be controlled to increase.

On the other hand, when the amount of heat transfer between the cold and the water decreases, the heating amount of transparent ice heater 430 may be controlled to decrease.

In this embodiment, when the ice making rate is maintained within the predetermined range, the ice making rate is less than the rate at which the bubbles move in the portion at which the ice is made, and no bubbles exist in the portion at which the ice is made.

Hereinafter, a method for controlling a refrigerator for making transparent ice when an opening/closing of a door is detected will be described as an example.

Figure 15:
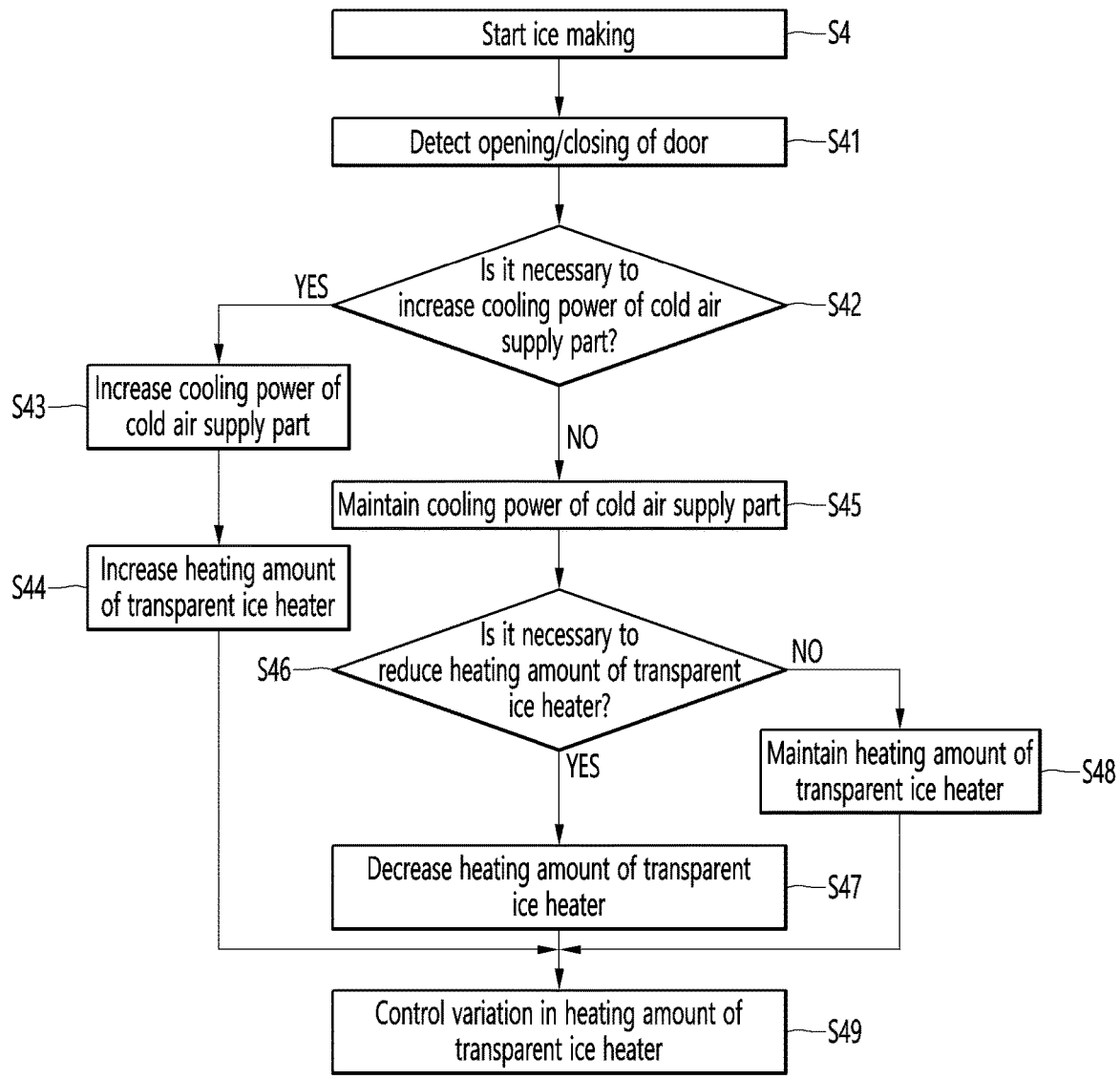
FIG. 15 is a view for explaining a method for controlling a refrigerator when an opening/closing of a door is detected during an ice making process.
Figure 16:
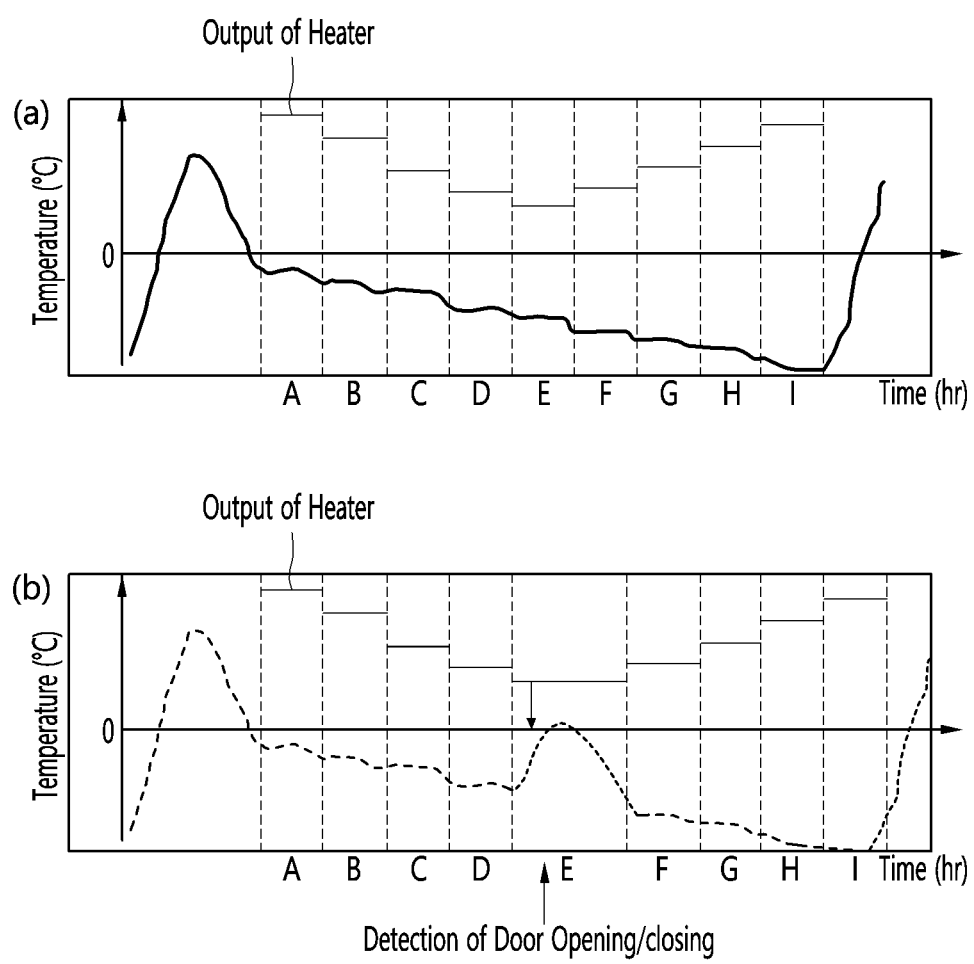
FIG. 16(a)-(b) is a view illustrating a change in output of a transparent ice heater for each unit height of water and a change in temperature sensed by a second temperature sensor during an ice making process.

FIG. 15 is a view for explaining a method for controlling a refrigerator when an opening/closing of a door is detected during an ice making process, and FIG. 16 is a view illustrating a change in output of a transparent ice heater for each unit height of water and a change in temperature sensed by a second temperature sensor during an ice making process.

FIG. 16(a) is a view illustrating a case in which the opening/closing of the door is not detected during the ice making process, and FIG. 16(b) is a view illustrating a case in which the opening/closing of the door is detected during the ice making process.

Referring to FIGS. 15 and 16, ice making may be started (S4), and the transparent ice heater 430 may be turned on during the ice making process to make ice. In the ice making process, the cold air supply part 900 may operate with a predetermined cooling power.

For example, the compressor may be turned on, and the fan may operate with a predetermined output.

During the ice making process, the door opening/closing detector 930 may detect the opening/closing of the door (for example, the door for opening/closing the freezing compartment) (S41).

When the door is opened, air outside the refrigerator may be introduced into the freezing compartment 32, and thus, there is a possibility that the temperature sensed by the first temperature sensor 33 will increase. In addition, when the door is opened, air outside the refrigerator may be introduced into the freezing compartment 32, and thus, there is a possibility that the temperature sensed by the second temperature sensor 700 will increase.

In this embodiment, after the opening/closing of the door is detected, the controller 800 may control the cold air supply part 900 or the transparent ice heater 430 based on the change in temperature sensed by the first temperature sensor 33 and the second temperature sensor 700. Thus, even when the door is opened or closed, the transparency of the transparent ice can be made uniform.

For example, when the opening/closing of the door is detected, the controller 800 may determine whether it is necessary to increase the cooling power of the cooling air supply part 900 (S42).

For example, when the temperature sensed by the first temperature sensor 33 is higher than or equal to the first set temperature after the opening/closing of the door is detected, the controller 800 may determine that it is necessary to increase the cooling power of the cooling air supply part 900.

On the other hand, when the temperature sensed by the first temperature sensor 33 is maintained below the first set temperature after the opening/closing of the door is detected, the controller 800 may determine that it is unnecessary to increase the cooling power of the cooling air supply part 900. In this case, the first set temperature is a temperature higher than the temperature sensed by the first temperature sensor 33 when the opening of the door is detected.

That is, when the door opening time is long, or when the door is opened and food having a temperature higher than the cold air of the freezing compartment 32 is added to the freezing compartment 32, the temperature of the freezing compartment 32 increases rapidly. Thus, the cooling power of the cold air supply part 900 may be increased for rapid cooling of the freezing compartment 32 (S43).

When the cooling power of the cold air supply part 900 increases, the controller 800 may increase the heating amount of the transparent ice heater 430 in response to the increase in the cooling power of the cold air supply part 900 (S44).

Alternatively, when the temperature sensed by the first temperature sensor 33 after the opening/closing of the door is detected is higher by more than the first set value than the temperature sensed by the first temperature sensor 33 before the opening/closing of the door is detected, the controller 800 may determine that it is necessary to increase the cooling power of the cooling air supply part 900.

On the other hand, when the temperature sensed by the first temperature sensor 33 after the opening/closing of the door is detected is not higher by more than the first set value than the temperature sensed by the first temperature sensor 33 before the opening/closing of the door is detected, the controller 800 may determine that it is unnecessary to increase the cooling power of the cooling air supply part 900.

That is, when the opening time of the door is short, the change in the temperature of the freezing compartment 32 may be small because the influence of the temperature of the air outside the refrigerator is small. In this case, the current cooling power may be maintained without increasing the cooling power of the cooling air supply part 900 (S45).

When it is determined to maintain the cooling power of the cold air supply part 900, the controller 800 may determine whether it is necessary to reduce the heating amount of the transparent ice heater 430 (S46).

For example, when the temperature sensed by the second temperature sensor 700 is higher than or equal to the second set temperature, the controller 800 may determine that it is necessary to reduce the heating amount of the transparent ice heater 430, and may reduce the heating amount of the transparent ice heater 430 (S47). That is, the heating amount of the transparent ice heater 430 may be reduced compared to the heating amount before the opening/closing of the door is detected.

After the opening/closing of the door is detected, when the temperature of the freezing compartment 32 increases and the temperature of the ice making cell 320*a* increases accordingly, the ice making rate may decrease due to the increase in the temperature of the ice making cell 320*a*. Thus, the heating amount of the transparent ice heater 430 may be reduced.

If the heating amount of the transparent ice heater 430 is maintained when the temperature of the ice making cell 320*a* increases, there is a disadvantage in that the ice making rate decreases significantly.

Therefore, when the temperature of the ice making cell 320*a* increases, the ice making rate of ice may decrease due to the increase in the temperature of the freezing compartment 32 even if the output of the transparent ice heater 430 is reduced. Thus, power consumption may be reduced by the reduction in the output of the transparent ice heater 430.

On the other hand, when the temperature sensed by the second temperature sensor 700 is maintained below the second set temperature after the opening/closing of the door is detected, the controller 800 may determine that it is unnecessary to reduce the heating amount of the transparent ice heater 430. In this case, the heating amount of the transparent ice heater 430 may be maintained (S48).

For another example, when the temperature sensed by the second temperature sensor 700 is increased by more than the second set value than the temperature sensed by the second temperature sensor 700 before the opening/closing of the door is detected, the controller 800 may determine that it is necessary to reduce the heating amount of the transparent ice heater 430, and may reduce the heating amount of the transparent ice heater 430 (S47).

On the other hand, when the temperature sensed by the second temperature sensor 700 after the opening/closing of the door is detected is not increased by more than the second set value than the temperature sensed by the second temperature sensor 700 before the opening/closing of the door is detected, the controller 800 may determine that it is unnecessary to increase the heating amount of the transparent ice heater 430.

As another example, when the heating amount of the transparent ice heater 430 is less than or equal to a reference value after the opening/closing of the door is detected, the controller 800 may maintain the heating amount of the transparent ice heater 430. On the other hand, when the heating amount of the transparent ice heater 430 is greater than the reference value after the opening/closing of the door is detected, the controller 800 may reduce the heating amount of the transparent ice heater 430. In this case, the reference value may be, for example, the minimum heating amount of the transparent ice heater.

Referring to FIG. 16(*a*), when the opening/closing of the door is not detected during the ice making process, the transparent ice heater 430 is controlled to vary the reference output for each section. The temperature sensed by the second temperature sensor 700 has a decreasing pattern.

On the other hand, referring to FIG. 16(*b*), when the opening/closing of the door is detected during the ice making process, the temperature sensed by the second temperature sensor 700 may increase.

As described above, after the opening/closing of the door is detected, if the controller 800 determines that it is necessary to reduce the heating amount of the transparent ice heater 430, the controller 800 may reduce the output of the transparent ice heater 430. Although not limited, the controller 800 may turn off the transparent ice heater 430.

When the opening/closing of the door is detected in a specific section and the heating amount of the transparent ice heater 430 is reduced, the controller 800 may determine whether the temperature sensed by the second temperature sensor 700 reaches a reference temperature of a next section.

For example, the variable control of the output of the transparent ice heater 430 is normally performed when a set time elapses in a state in which the heating amount of the transparent ice heater 430 is reduced, or when the temperature sensed by the second temperature sensor 700 reaches a section reference temperature corresponding to the next section of the section in which the heating amount is reduced (S49).

For example, when the variable control of the heating amount of the transparent ice heater 430 is performed during the ice making process, the timing at which the heating amount of the transparent ice heater 430 varies may be determined by time or the temperature sensed by the second temperature sensor 700.

When the transparent ice heater 430 starts operating with the reference heating amount corresponding to the current section and the set time elapses, the heating amount of the transparent ice heater 430 may be changed to the reference heating amount corresponding to the next section.

In this case, the reference temperature for changing the section is predetermined in the memory independently of the set time.

That is, the reference temperature of each of the plurality of sections may be predetermined and stored in the memory. In this embodiment, the reference temperature is not used in the normal ice making process, but may be used only when determining whether it is necessary to reduce the heating amount of the transparent ice heater 430 after the opening/closing of the door is detected.

As another example, when the transparent ice heater 430 starts operating with the reference heating amount corresponding to the current section and the temperature reaches the reference temperature for changing the section, the heating amount of the transparent ice heater 430 may be changed to the reference heating amount corresponding to the next section.

In this case, the reference temperature of each of the plurality of sections may be predetermined and stored in the memory. Even in the normal ice making process, the variable control of the heating amount of the transparent ice heater 430 may be performed using the reference temperature.

If the heating amount of the transparent ice heater 430 decreases after the opening/closing of the door is detected when using the reference temperature for changing the section as described above, the time it takes for the second temperature sensor 700 to reach the reference temperature for the start of the next section increases.

Consequently, in the whole ice making process, the ice making time when the opening/closing of the door is detected during the ice making process and the heating amount of the transparent ice heater is reduced may be longer than the ice making time when the opening/closing of the door is not detected during the ice making process.

Referring to FIG. 16(*b*), when the opening/closing of the door is detected in section E and the temperature sensed by the second temperature sensor 700 reaches the section reference temperature corresponding to section F, which is the next section of section E, in a state where the heating amount of the transparent ice heater 430 is reduced, the heating amount of the transparent ice heater 430 may be changed to a heating amount corresponding to the section F. Sequentially, the heating amount of the transparent ice heater 430 may be controlled so that the transparent ice heater 430 operates with the reference heating amount corresponding to sections G to I.

In summary, when it is necessary to reduce the heating amount of the transparent ice heater 430, the controller 800 reduces the heating amount of the transparent ice heater 430 only in the current section, and when the next section starts, the controller 800 normally performs the variable control of the heating amount of the transparent ice heater 43 in the next section (S49).

According to this embodiment, after detecting the opening/closing of the door, by controlling the heating amount of the transparent ice heater and the cold air supply part based on the temperature sensed by the first temperature sensor and the temperature sensed by the second temperature sensor, the temperature of the freezing compartment may be maintained at the target temperature, and the supply of excessive heat to the ice making cell may be prevented.

In addition, if the temperature of the ice making cell rises, power consumption of the transparent ice heater can be reduced by reducing the heating amount of the transparent ice heater.

Although the method for controlling the refrigerator of FIG. 16 has been described as including operations S42 to S48, the method for controlling the refrigerator may not include operations S42 to S45. That is, when the opening/closing of the door is detected, operation S46 may be immediately performed.

In addition, it should be noted that there is no restriction on the order of operations S42 and S46 in FIG. 16. That is, it is also possible that operation S46 is performed first, and then operation S42 is performed.

In the present disclosure, the "operation" of the refrigerator may be defined as including four operation processes: a process of determining whether the start condition of the operation is satisfied, a process in which a predetermined operation is performed when the start condition is satisfied, a process of determining whether the end condition of the operation is satisfied, and a process in which the operation is ended when the end condition is satisfied.

In the present disclosure, the "operation" of the refrigerator may be classified into a general operation for cooling the storage chamber of the refrigerator and a special operation for starting when a special condition is satisfied. The controller of the present disclosure may perform control so that, when the normal operation and the special operation collide, the special operation is preferentially performed, and the normal operation is stopped. When the execution of the special operation is completed, the controller may control the normal operation to resume.

In the present disclosure, the collision of the operation may be defined as a case in which the start condition of operation A and the start condition of operation B are satisfied at the same time, a case in which the start condition of operation A is satisfied and the start condition of operation B is satisfied while operation A is being performed, and a case in which when the start condition of operation B is satisfied and the start condition of operation A is satisfied while the operation is being performed.

On the other hand, the general operation for generating transparent ice (hereinafter referred to as "first transparent ice operation") may be defined as an operation in which, after the water supply to the ice making cell 320*a* is completed, the controller 800 controls at least one of the cooling power of the cold air supply part 900 or the heating amount of the transparent ice heater 430 to vary in order to perform a typical ice making process.

The first transparent ice operation may include a process in which the controller 800 controls the cold air supply part 900 to supply cold air to the ice making cell 320*a*.

The first transparent ice operation may include a process in which the controller 800 may control the transparent ice heater 430 to be turned on in at least partial section while the cold air supply part 900 supplies the cold air so that bubbles dissolved in the water within the ice making cell 320*a* moves from a portion, at which the ice is made, toward the water that is in a liquid state to make transparent ice.

The controller 800 may control the turned-on transparent ice heater 430 to be varied by a predetermined reference heating amount in each of a plurality of pre-divided sections.

The plurality of pre-divided sections may include at least one of a case in which the sections are classified based on the unit height of the water to be iced, a case in which the sections are divided based on the elapsed time after the second tray 380 moves to the ice making position, and a case in which the sections are divided based on the temperature detected by the second temperature sensor 700 after the second tray 380 moves to the ice making position.

On the other hand, the special operation for making transparent ice (hereinafter referred to as "second transparent ice operation") may include a transparent ice operation for door load response, which performs the ice making process when the start condition of the door load response operation is satisfied, and a transparent ice operation for defrosting response to perform the ice making process when the start condition of the defrosting operation is satisfied.

When the controller 800 satisfies the start condition of the door load response operation for the cold air supply part 900, the transparent ice operation for door load response may include increasing the cooling power of the cold air supply part 900 in order to remove the heat load inputted to the storage chamber by opening or closing the door.

When the controller 800 satisfies the start condition of the door load response operation for the transparent ice heater 430, the transparent ice operation for door load response may include a process of performing control to reduce the deterioration of the ice making efficiency due to the lowering of the ice making rate caused by the inputted heat load, and make the heating amount of the transparent ice heater 430 be smaller than the heating amount during the first transparent ice operation in order to maintain the ice making rate within a predetermined range and uniformly maintain the transparency of ice.

The start condition of the door load response operation for the cold air supply part 900 and the start condition of the door load response operation for the transparent ice heater 430 may be different from each other.

The end condition of the door load response operation for the cold air supply part 900 and the end condition of the door load response operation for the transparent ice heater 430 may be different from each other.

The case in which the start condition of the door load response operation for the cold air supply part 900 is satisfied may refer to a case in which, after the opening/closing of the door is detected, it is determined whether it is necessary to vary the cooling power of the cold air supply part 900, and it is determined that it is necessary to vary the cooling power.

The case in which the start condition of the door load response operation for the cold air supply part 900 is satisfied may include at least one of a case in which the first set time elapses from the detection of the opening of the door, a case in which the temperature sensed by the first temperature sensor becomes higher than the first set temperature after the opening/closing of the door is detected, and a case in which the temperature is higher by more than the first set value than the temperature sensed by the first temperature sensor 33 after the opening/closing of the door is detected.

The case in which the start condition of the door load response operation for the transparent ice heater 430 is satisfied may refer to a case in which, after the opening/closing of the door is detected, it is determined whether it is necessary to vary the heating amount of the transparent ice heater 430, and it is determined that it is necessary to vary the heating amount.

The case in which the start condition of the door load response operation for the transparent ice heater 430 is satisfied may include at least one of a case in which the second set time elapses from the detection of the opening of the door, a case in which the temperature sensed by the second temperature sensor becomes higher than or equal to the second set temperature after the opening/closing of the door is detected, a case in which the temperature is higher by more than a second set value than the temperature sensed by the second temperature sensor after the opening/closing of the door is detected, a case in which the change in temperature sensed by the second temperature sensor per unit time after the opening/closing of the door is detected is greater than zero, a case in which the current heating amount of the transparent ice heater 430 is greater than a reference value after the opening/closing of the door is detected, and a case in which the start condition of the door load response operation for the cold air supply parts 900 is satisfied.

As another example, after the opening/closing of the door is detected, when the amount of change in temperature sensed by the second temperature sensor 700 per unit time is greater than zero, the controller 800 may reduce the heating amount of the transparent ice heater 430. On the other hand, when the change in temperature is not greater than zero, the heating amount of the transparent ice heater 430 may be maintained.

After both the end condition of the door load response operation for the cold air supply part 900 and the end condition of the door load response operation for the transparent ice heater 430 are satisfied, the controller 800 may control the first transparent ice operation to resume.

The case in which the end condition of the door load response operation for the cold air supply part 900 is satisfied may include at least one of a case in which the A set time elapses from the start of the door load response operation, a case in which the temperature sensed by the first temperature sensor becomes less than or equal to the A set temperature after the door load response operation starts, and a case in which the temperature sensed by the first temperature sensor 33 is lower than or equal to the A set value after the door load response operation starts.

The case in which the end condition of the door load response operation for the transparent ice heater 430 is satisfied may include at least one of a case in which the B set time elapses from the start of the door load response operation, a case in which the temperature sensed by the second temperature sensor 700 after the start of the door load response operation is less than or equal to the B set temperature, a case in which the temperature is lower than the temperature sensed by the second temperature sensor 700 by less than the B set value, a case in which the change in temperature sensed by the second temperature sensor 700 per unit time after the start of the door load response operation is less than zero, and a case in which the door load response operation for the cold air supply part 900 is end.

The first set temperature and the A set temperature may be equal to or different from each other. The second set temperature and the B set temperature may be equal to or different from each other. The first set value and the A set value may also be equal to or different from each other. The second set value and the B set value may also be equal to or different from each other.

The second set value may be set differently according to a plurality of sections. At least one of the second set values may be greater than the first set value.

The invention claimed is:

1. A refrigerator comprising:
   a storage chamber;
   a first temperature sensor configured to sense a temperature of the storage chamber;
   a door configured to open or close the storage chamber;
   a cold air supply configured to provide cold air;
   a tray provided in the storage chamber and including a cell that forms a space in which liquid introduced into the space is to phase-change into ice;
   a second temperature sensor configured to sense a temperature in the cell;
   a first heater configured to supply heat to the tray in an ice making process;
   a second heater configured to supply heat to the tray in an ice separation process; and a controller configured to:
> when the controller determines that it is necessary to increase cooling power of the cold air supply based on the temperature sensed by the first temperature sensor after detecting opening or closing of the door during the ice making process, the controller is to increase the cooling power of the cold air supply, and when the cooling power of the cold air supply is determined to be increased, the controller is to increase a heating amount of the first heater, and
>
> after detecting opening or closing of the door during the ice making process, when the controller determines that it is necessary to reduce a heating amount of the first heater based on a change of the temperature sensed by the second temperature sensor, the controller is to reduce the heating amount of the first heater.

2. The refrigerator of claim 1, wherein when the controller determines that it is not necessary to increase the cooling power of the cold air supply after the detecting the opening or the closing of the door during the ice making process, the cooling power of the cold air supply is maintained, and
> when the controller determines that it is not necessary to reduce the heating amount of the first heater based on the change of the temperature sensed by the second temperature sensor, the heating amount of the first heater is maintained.

3. The refrigerator of claim 2, wherein when the temperature sensed by the first temperature sensor is equal to or higher than a first set temperature after the detecting the opening or the closing of the door during the ice making process, increasing the cooling power of the cold air supply, and
> when the temperature sensed by the first temperature sensor is below the first set temperature during the ice making process, the controller maintains the cooling power of the cold air supply.

4. The refrigerator of claim 2, wherein when the temperature sensed by the first temperature sensor after the detecting the opening or the closing of the door is higher by more than a first set value than the temperature sensed by the first temperature sensor when the opening of the door is sensed, the controller is to increase the cooling power of the cold air supply, and
> when the temperature sensed by the first temperature sensor is not higher by more than the first set value than the temperature sensed by the first temperature sensor when the opening of the door is detected, the controller is to maintain the cooling power of the cold air supply.

5. The refrigerator of claim 2, wherein when the temperature sensed by the second temperature sensor is higher than or equal to a second set temperature after the detecting of the opening or the closing of the door during the ice making process, the controller is to reduce the heating amount of the first heater, and
> when the temperature sensed by the second temperature sensor is below the second set temperature during the ice making process, the controller is to maintain the heating amount of the first heater.

6. The refrigerator of claim 2, wherein a first sensed temperature is the temperature sensed by the second temperature sensor after the detecting the opening or the closing of the door during the ice making process, a second sensed temperature is the temperature sensed by the second temperature sensor before the detecting the opening or the closing of the door, and the controller is configured to reduce the heating amount of the first heater when the first sensed temperature is more than a second set value above the second sensed temperature, and
> the controller is configured to maintain the heating amount of the first heater when the second sensed temperature is not more than the second set value above the first sensed temperature.

7. The refrigerator of claim 2, wherein when a current heating amount of the first heater is less than or equal to a reference value after the detecting of the opening or the closing of the door during the ice making process, the controller is to maintain the heating amount of the first heater, and
> when the current heating amount of the first heater is greater than the reference value after the detecting of the opening or the closing of the door during the ice making process, the controller is to reduce the heating amount of the first heater.

8. The refrigerator of claim 7, wherein when the controller determines that it is necessary to reduce the heating amount of the first heater, the controller is to turn off the first heater.

9. The refrigerator of claim 1, wherein the controller is configured to control the first heater such that the heating amount of the first heater varies.

10. The refrigerator of claim 9, wherein a plurality of sections are defined based on a volume per unit height of the cell, and
> a reference heating amount of the first heater in each of the plurality of sections is predetermined.

11. The refrigerator of claim 10, wherein when the heating amount of the first heater is to be reduced after the detecting of the opening or the closing of the door during the ice making process, the controller is to reduce the heating amount of the first heater in a current section.

12. The refrigerator of claim 11, wherein when the temperature sensed by the second temperature sensor reaches a reference temperature corresponding to a section immediately next to the current section, the controller is to operate the first heater with the reference heating amount corresponding to the next section.

13. The refrigerator of claim 1, wherein the tray comprises a first tray configured to define a first portion of the cell and a second tray configured to define a second portion of the cell, and
> the second tray contacts the first tray in the ice making process, and the second tray is spaced apart from the first tray in an ice separation process.

14. The refrigerator of claim 13, wherein one of the first tray and the second tray is made of a non-metal material to reduce a heat transfer rate of the first heater.

15. The refrigerator of claim 14, wherein the second tray is disposed below the first tray,
> the first heater is disposed adjacent to the second tray such that liquid starts to freeze from above in the cell, and
> at least the second tray is made of a non-metal material.

16. The refrigerator of claim 15, wherein at least one of the first tray and the second tray is made of a flexible or soft material such that a shape thereof is deformed during the ice separation process and is returned to an original shape.

17. A method for controlling a refrigerator that includes a first tray accommodated in a storage chamber, a second tray configured to define a cell together with the first tray, a cold air supply configured to provide cold air, and a heater configured to supply heat to the cell such that bubbles dissolved in a liquid inside the cell move from a portion at which ice is made toward the liquid, the method comprising:
> performing an ice making process after a liquid supply is completed;

turning on the heater during the ice making process;

detecting opening or closing of a door during the ice making process;

when the opening or the closing of the door is detected during the ice making process, determining whether to reduce, maintain or increase a heating amount of the heater, based on a sensed temperature of the cell, and determining whether to increase cooling power of the cold air supply based on a temperature of the storage chamber;

when the cooling power of the cold air supply is determined to be increased, increasing the cooling power of the cold air supply and increasing the heating amount of the heater such that an ice making rate is maintained within a predetermined range, and when the heating amount of the heater is determined to be reduced, reducing the heating amount of the heater.

18. The method of claim 17, wherein when the heating amount of the heater is not to be reduced, maintaining the heating amount of the heater.

19. The method of claim 17, wherein when the heating amount is to be reduced, the heater is to be turned off.

20. The method of claim 17, further comprising:
determining whether the ice making process is completed; and when the ice making process is determined to be completed, moving the second tray from an ice making position to an ice separation position.

21. The method of claim 17, wherein the turning on the heater during the ice making process includes varying the heating amount of the heater without detecting opening or closing of the door during the ice making process.

22. A refrigerator comprising:
a storage chamber;
a door configured to open or close the storage chamber;
a cold air supply configured to provide cold air;
a tray provided in the storage chamber and including a cell that forms a space in which liquid introduced into the space is to phase-change into ice;
a temperature sensor configured to sense a temperature in the cell;
a first heater in contact with the tray, and configured to supply heat to the tray in an ice making process;
a second heater configured to supply heat to the tray in an ice separating process; and
a controller configured to:
after detecting opening or closing of the door during the ice making process,
determine whether to increase cooling power of the cold air supply based on a temperature of the storage chamber; and
determine whether to reduce a heating amount of the first heater based on a change of the temperature sensed by the temperature sensor,
wherein when the cooling power of the cold air supply is determined to be increased, the controller is configured to increase the cooling power of the cold air supply and increase the heating amount of the first heater.

23. The refrigerator of claim 22, wherein when the controller determines not to increase the cooling power of the cold air supply after the detecting the opening or the closing of the door during the ice making process, the cooling power of the cold air supply is maintained, and
when the controller determines not to reduce the heating amount of the first heater based on the change of the temperature sensed by the temperature sensor, the heating amount of the first heater is maintained.

24. The refrigerator of claim 22, wherein the controller is configured to control the first heater such that the heating amount of the first heater vanes without detecting opening or closing of the door during the ice making process.

* * * * *